(12) United States Patent
Thouzeau et al.

(10) Patent No.: US 11,227,344 B2
(45) Date of Patent: *Jan. 18, 2022

(54) GRAPHICAL REPRESENTATION OF A COMPLEX TASK

(71) Applicant: Palantir Technologies Inc., Palo Alto, CA (US)

(72) Inventors: Arthur Thouzeau, London (GB); Ankit Shankar, Redwood City, CA (US); Bianca Rahill-Marier, New York, NY (US); Casey Patton, Corona, CA (US); Geoff Stowe, San Francisco, CA (US); Spencer Tank, Princeton, NJ (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/930,252

(22) Filed: Jul. 15, 2020

(65) Prior Publication Data

US 2020/0342549 A1 Oct. 29, 2020

Related U.S. Application Data

(63) Continuation of application No. 15/459,811, filed on Mar. 15, 2017, now Pat. No. 10,726,507.

(Continued)

(51) Int. Cl.
*G06F 3/048* (2013.01)
*G06Q 50/04* (2012.01)
(Continued)

(52) U.S. Cl.
CPC ........... *G06Q 50/04* (2013.01); *G06F 3/0482* (2013.01); *G06F 16/90324* (2019.01); *G06Q 10/06316* (2013.01); *G06T 11/206* (2013.01)

(58) Field of Classification Search
CPC .................. G06F 16/90324; G06F 3/0482
See application file for complete search history.

(56) References Cited

U.S. PATENT DOCUMENTS

| | | | |
|---|---|---|---|
| 5,515,488 A | 5/1996 | Hoppe et al. | |
| 6,430,305 B1 | 8/2002 | Decker | |

(Continued)

FOREIGN PATENT DOCUMENTS

| | | | |
|---|---|---|---|
| CN | 102054015 A | 5/2011 | |
| CN | 102546446 A | 7/2012 | |

(Continued)

OTHER PUBLICATIONS

"HunchLab: Heat Map and Kernel Density Calculation for Crime Analysis," Azavea Journal, printed fromwww.azavea.com/blogs/newsletter/v4i4/kernel-density-capabilities-added- —hunchlab/ on Sep. 9, 2014, 2 pages.

(Continued)

*Primary Examiner* — Linh K Pham
(74) *Attorney, Agent, or Firm* — Sheppard Mullin Richter & Hampton LLP

(57) ABSTRACT

Systems and methods are provided for storing data representing respective sub-elements of a complex task. Data representing one or more links between two or more sub-elements is stored, the links indicating a dependency between said sub-elements. A work order is calculated based on the identified links. A graphical representation of the calculated work order which indicates said sub-elements and their dependencies is provided. The links may indicate a temporal dependency of a second sub-element on a first sub-element and in which the provided graphical representation presents the temporal relationship of the sub-elements. Historical data may be received for association with one or more selected links or sub-elements, the historical data related to a prior event and which affects the temporal (Continued)

relationship between the sub-elements. An updated work order modified by the historical data may be calculated. An updated graphical representation of the work order may be provided.

15 Claims, 16 Drawing Sheets

Related U.S. Application Data

(60) Provisional application No. 62/421,013, filed on Nov. 11, 2016.

(51) Int. Cl.
*G06T 11/20* (2006.01)
*G06F 3/0482* (2013.01)
*G06Q 10/06* (2012.01)
*G06F 16/9032* (2019.01)

(56) References Cited

U.S. PATENT DOCUMENTS

| | | |
|---|---|---|
| 6,732,361 B1 | 5/2004 | Andreoli |
| 6,820,135 B1 | 11/2004 | Dingman |
| 6,978,419 B1 | 12/2005 | Kantrowitz |
| 6,980,984 B1 | 12/2005 | Huffman et al. |
| 7,168,039 B2 | 1/2007 | Bertram |
| 7,461,077 B1 | 12/2008 | Greenwood |
| 7,529,698 B2 | 5/2009 | Joao |
| 7,617,232 B2 | 11/2009 | Gabbert et al. |
| 7,756,843 B1 | 7/2010 | Palmer |
| 7,899,796 B1 | 3/2011 | Borthwick et al. |
| 7,917,376 B2 | 3/2011 | Bellin et al. |
| 7,941,321 B2 | 5/2011 | Greenstein et al. |
| 8,036,971 B2 | 10/2011 | Aymeloglu et al. |
| 8,037,046 B2 | 10/2011 | Udezue et al. |
| 8,046,283 B2 | 10/2011 | Burns |
| 8,054,756 B2 | 11/2011 | Chand et al. |
| 8,108,878 B1 | 1/2012 | Pulsipher |
| 8,214,490 B1 | 7/2012 | Vos et al. |
| 8,229,902 B2 | 7/2012 | Vishniac et al. |
| 8,290,838 B1 | 10/2012 | Thakur et al. |
| 8,302,855 B2 | 11/2012 | Ma et al. |
| 8,386,377 B1 | 2/2013 | Xiong et al. |
| 8,473,454 B2 | 6/2013 | Evanitsky et al. |
| 8,484,115 B2 | 7/2013 | Aymeloglu et al. |
| 8,489,641 B1 | 7/2013 | Seefeld et al. |
| 8,577,911 B1 | 11/2013 | Stepinski et al. |
| 8,584,047 B2 | 11/2013 | Athans |
| 8,589,273 B2 | 11/2013 | Creeden et al. |
| 8,683,344 B2 | 3/2014 | Falkenberg |
| 8,688,573 B1 | 4/2014 | Ruknoic et al. |
| 8,744,890 B1 | 6/2014 | Bernier |
| 8,799,799 B1 | 8/2014 | Cervelli et al. |
| 8,806,355 B2 | 8/2014 | Twiss et al. |
| 8,812,960 B1 | 8/2014 | Sun et al. |
| 8,924,388 B2 | 12/2014 | Elliot et al. |
| 8,924,389 B2 | 12/2014 | Elliot et al. |
| 8,938,686 B1 | 1/2015 | Erenrich et al. |
| 8,949,164 B1 | 2/2015 | Mohler |
| 9,069,842 B2 | 6/2015 | Melby |
| 9,100,428 B1 | 8/2015 | Visbal |
| 9,111,281 B2 | 8/2015 | Stibel et al. |
| 9,128,804 B2 * | 9/2015 | Gores .................. G06F 8/71 |
| 9,129,219 B1 | 9/2015 | Robertson et al. |
| 9,256,664 B2 | 2/2016 | Chakerian et al. |
| 9,280,618 B1 | 3/2016 | Bruce et al. |
| 9,286,373 B2 | 3/2016 | Elliot et al. |
| 9,335,911 B1 | 5/2016 | Elliot et al. |
| 2002/0065708 A1 | 5/2002 | Senay et al. |
| 2002/0095658 A1 | 7/2002 | Shulman |
| 2002/0103705 A1 | 8/2002 | Brady |
| 2002/0147805 A1 | 10/2002 | Leshem |
| 2003/0126102 A1 | 7/2003 | Borthwick |
| 2004/0034570 A1 | 2/2004 | Davis |
| 2004/0111480 A1 | 6/2004 | Yue |
| 2004/0153418 A1 | 8/2004 | Hanweck |
| 2004/0236688 A1 | 11/2004 | Bozeman |
| 2005/0010472 A1 | 1/2005 | Quatse et al. |
| 2005/0086207 A1 | 4/2005 | Heuer et al. |
| 2005/0154628 A1 | 7/2005 | Eckart et al. |
| 2005/0154769 A1 | 7/2005 | Eckart et al. |
| 2005/0262005 A1 | 11/2005 | Woolston |
| 2006/0026120 A1 | 2/2006 | Carolan et al. |
| 2006/0026170 A1 | 2/2006 | Kreitler et al. |
| 2006/0080283 A1 | 4/2006 | Shipman |
| 2006/0106846 A1 * | 5/2006 | Schulz .................. G06Q 10/10 |
| 2006/0143034 A1 | 6/2006 | Rothermel |
| 2006/0143075 A1 | 6/2006 | Carr et al. |
| 2006/0143079 A1 | 6/2006 | Basak et al. |
| 2006/0277487 A1 * | 12/2006 | Poulsen .................. G06Q 10/06 715/772 |
| 2007/0000999 A1 | 1/2007 | Kubo et al. |
| 2007/0011034 A1 | 1/2007 | Jones |
| 2007/0011304 A1 | 1/2007 | Error |
| 2007/0038543 A1 | 2/2007 | Weinstein |
| 2007/0038646 A1 | 2/2007 | Thota |
| 2007/0150801 A1 | 6/2007 | Chidlovskii et al. |
| 2007/0156673 A1 | 7/2007 | Maga |
| 2007/0162454 A1 | 7/2007 | D'Albora et al. |
| 2007/0185867 A1 | 8/2007 | Maga |
| 2007/0192122 A1 | 8/2007 | Routson et al. |
| 2007/0284433 A1 | 12/2007 | Domenica et al. |
| 2008/0065655 A1 | 3/2008 | Chakravarthy et al. |
| 2008/0069081 A1 | 3/2008 | Chand et al. |
| 2008/0077642 A1 | 3/2008 | Carbone et al. |
| 2008/0103996 A1 | 5/2008 | Forman et al. |
| 2008/0208735 A1 | 8/2008 | Balet et al. |
| 2008/0222295 A1 | 9/2008 | Robinson et al. |
| 2008/0243711 A1 | 10/2008 | Aymeloglu et al. |
| 2008/0255973 A1 | 10/2008 | El Wade et al. |
| 2008/0270328 A1 | 10/2008 | Lafferty et al. |
| 2008/0294663 A1 | 11/2008 | Heinley et al. |
| 2008/0313132 A1 | 12/2008 | Hao et al. |
| 2009/0076845 A1 | 3/2009 | Bellin et al. |
| 2009/0094166 A1 | 4/2009 | Aymeloglu et al. |
| 2009/0094270 A1 | 4/2009 | Alirez et al. |
| 2009/0106178 A1 | 4/2009 | Chu |
| 2009/0112745 A1 | 4/2009 | Stefanescu |
| 2009/0125359 A1 | 5/2009 | Knapic |
| 2009/0125459 A1 | 5/2009 | Norton et al. |
| 2009/0132953 A1 | 5/2009 | Reed et al. |
| 2009/0157732 A1 | 6/2009 | Hao et al. |
| 2009/0187546 A1 | 7/2009 | Whyte et al. |
| 2009/0187548 A1 | 7/2009 | Ji et al. |
| 2009/0249244 A1 | 10/2009 | Robinson et al. |
| 2009/0254842 A1 | 10/2009 | Leacock et al. |
| 2009/0259636 A1 | 10/2009 | Labrou et al. |
| 2009/0271343 A1 | 10/2009 | Vaiciulis et al. |
| 2009/0307049 A1 | 12/2009 | Elliott et al. |
| 2009/0313463 A1 | 12/2009 | Pang et al. |
| 2009/0319418 A1 | 12/2009 | Herz |
| 2009/0319515 A1 | 12/2009 | Minton et al. |
| 2009/0319891 A1 | 12/2009 | MacKinlay |
| 2010/0030722 A1 | 2/2010 | Goodson et al. |
| 2010/0031141 A1 | 2/2010 | Summers et al. |
| 2010/0042922 A1 | 2/2010 | Bradateanu et al. |
| 2010/0057622 A1 | 3/2010 | Faith et al. |
| 2010/0070842 A1 | 3/2010 | Aymeloglu et al. |
| 2010/0098318 A1 | 4/2010 | Anderson |
| 2010/0106752 A1 | 4/2010 | Eckardt, III |
| 2010/0114887 A1 | 5/2010 | Conway et al. |
| 2010/0131502 A1 | 5/2010 | Fordham |
| 2010/0161735 A1 | 6/2010 | Sharma |
| 2010/0191563 A1 | 7/2010 | Schlaifer et al. |
| 2010/0211535 A1 | 8/2010 | Rosenberger |
| 2010/0235915 A1 | 9/2010 | Memon et al. |
| 2010/0262688 A1 | 10/2010 | Hussain et al. |
| 2010/0293174 A1 | 11/2010 | Bennett et al. |
| 2010/0305994 A1 * | 12/2010 | Gaskell .................. G06Q 10/06 705/7.23 |
| 2010/0312837 A1 | 12/2010 | Bodapati et al. |

(56) References Cited

U.S. PATENT DOCUMENTS

| | | |
|---|---|---|
| 2011/0040776 A1 | 2/2011 | Najm et al. |
| 2011/0061013 A1 | 3/2011 | Bilicki et al. |
| 2011/0078173 A1 | 3/2011 | Seligmann et al. |
| 2011/0093327 A1 | 4/2011 | Fordyce, III et al. |
| 2011/0099133 A1 | 4/2011 | Chang et al. |
| 2011/0138292 A1 | 6/2011 | Falkenberg |
| 2011/0153384 A1 | 6/2011 | Horne et al. |
| 2011/0173093 A1 | 7/2011 | Psota et al. |
| 2011/0208565 A1 | 8/2011 | Ross et al. |
| 2011/0208724 A1 | 8/2011 | Jones et al. |
| 2011/0213655 A1 | 9/2011 | Henkin |
| 2011/0218955 A1 | 9/2011 | Tang |
| 2011/0225033 A1 | 9/2011 | Schmeyer |
| 2011/0270604 A1 | 11/2011 | Qi et al. |
| 2011/0270834 A1 | 11/2011 | Sokolan et al. |
| 2011/0289397 A1 | 11/2011 | Eastmond et al. |
| 2011/0295649 A1 | 12/2011 | Fine |
| 2011/0314007 A1 | 12/2011 | Dassa et al. |
| 2011/0314024 A1 | 12/2011 | Chang et al. |
| 2012/0004904 A1 | 1/2012 | Shin et al. |
| 2012/0011238 A1 | 1/2012 | Rathod |
| 2012/0011245 A1 | 1/2012 | Gillette et al. |
| 2012/0022945 A1 | 1/2012 | Falkenborg et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0079363 A1 | 3/2012 | Folting et al. |
| 2012/0084117 A1 | 4/2012 | Tavares et al. |
| 2012/0084287 A1 | 4/2012 | Lakshminarayan et al. |
| 2012/0089606 A1 | 4/2012 | Eshwar et al. |
| 2012/0131512 A1 | 5/2012 | Takeuchi et al. |
| 2012/0144335 A1 | 6/2012 | Abeln et al. |
| 2012/0158527 A1 | 6/2012 | Cannelongo et al. |
| 2012/0159362 A1 | 6/2012 | Brown et al. |
| 2012/0173381 A1 | 7/2012 | Smith |
| 2012/0215784 A1 | 8/2012 | King et al. |
| 2012/0221553 A1 | 8/2012 | Wittmer et al. |
| 2012/0226523 A1 | 9/2012 | Weiss |
| 2012/0245976 A1 | 9/2012 | Kumar et al. |
| 2012/0323888 A1 | 12/2012 | Osann, Jr. |
| 2013/0016106 A1 | 1/2013 | Yip et al. |
| 2013/0054299 A1 | 2/2013 | Deshpande |
| 2013/0054306 A1 | 2/2013 | Bhalla |
| 2013/0055145 A1 | 2/2013 | Antony et al. |
| 2013/0057551 A1 | 3/2013 | Ebert et al. |
| 2013/0096988 A1 | 4/2013 | Grossman et al. |
| 2013/0110746 A1 | 5/2013 | Ahn |
| 2013/0151453 A1 | 6/2013 | Bhanot et al. |
| 2013/0166348 A1 | 6/2013 | Scotto |
| 2013/0166480 A1 | 6/2013 | Popescu et al. |
| 2013/0185245 A1 | 7/2013 | Anderson |
| 2013/0185307 A1 | 7/2013 | El-Yaniv et al. |
| 2013/0218879 A1 | 8/2013 | Park et al. |
| 2013/0226318 A1 | 8/2013 | Procyk |
| 2013/0238616 A1 | 9/2013 | Rose et al. |
| 2013/0246170 A1 | 9/2013 | Gross et al. |
| 2013/0246537 A1 | 9/2013 | Gaddala |
| 2013/0246597 A1 | 9/2013 | Iizawa et al. |
| 2013/0263019 A1 | 10/2013 | Castellanos et al. |
| 2013/0268520 A1 | 10/2013 | Fisher et al. |
| 2013/0282696 A1 | 10/2013 | John et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2013/0318604 A1 | 11/2013 | Coates et al. |
| 2014/0012796 A1 | 1/2014 | Petersen et al. |
| 2014/0040371 A1 | 2/2014 | Gurevich et al. |
| 2014/0053091 A1 | 2/2014 | Hou et al. |
| 2014/0058914 A1 | 2/2014 | Song et al. |
| 2014/0068487 A1 | 3/2014 | Steiger et al. |
| 2014/0095509 A1 | 4/2014 | Patton |
| 2014/0108380 A1 | 4/2014 | Gotz et al. |
| 2014/0108985 A1 | 4/2014 | Scott |
| 2014/0123279 A1 | 5/2014 | Bishop et al. |
| 2014/0136285 A1 | 5/2014 | Carvalho |
| 2014/0143009 A1 | 5/2014 | Brice et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange |
| 2014/0189870 A1 | 7/2014 | Singla et al. |
| 2014/0195515 A1 | 7/2014 | Baker et al. |
| 2014/0222521 A1 | 8/2014 | Chait |
| 2014/0222793 A1 | 8/2014 | Sadkin et al. |
| 2014/0229554 A1 | 8/2014 | Grunin et al. |
| 2014/0280056 A1 | 9/2014 | Kelly |
| 2014/0282160 A1 | 9/2014 | Zarpas |
| 2014/0330845 A1 | 11/2014 | Feldschuh |
| 2014/0344230 A1 | 11/2014 | Krause et al. |
| 2014/0358829 A1 | 12/2014 | Hurwitz |
| 2014/0366132 A1 | 12/2014 | Stiansen et al. |
| 2015/0073929 A1 | 3/2015 | Psota et al. |
| 2015/0073954 A1 | 3/2015 | Braff |
| 2015/0095773 A1 | 4/2015 | Gonsalves et al. |
| 2015/0100897 A1 | 4/2015 | Sun et al. |
| 2015/0106170 A1 | 4/2015 | Bonica |
| 2015/0106379 A1 | 4/2015 | Elliot et al. |
| 2015/0134599 A1 | 5/2015 | Banerjee et al. |
| 2015/0135256 A1 | 5/2015 | Hoy et al. |
| 2015/0188872 A1 | 7/2015 | White |
| 2015/0242401 A1 | 8/2015 | Liu |
| 2015/0278734 A1* | 10/2015 | Grant ............... E21B 41/00 705/7.23 |
| 2015/0338233 A1 | 11/2015 | Cervelli et al. |
| 2015/0379413 A1 | 12/2015 | Robertson et al. |
| 2016/0004764 A1 | 1/2016 | Chakerian et al. |
| 2016/0180557 A1 | 6/2016 | Yousaf et al. |
| 2016/0246271 A1 | 8/2016 | Shen |
| 2017/0109217 A1* | 4/2017 | Raman ............... G06F 9/5027 |
| 2017/0155557 A1 | 6/2017 | Desai |
| 2018/0357552 A1 | 12/2018 | Campos |

FOREIGN PATENT DOCUMENTS

| | | |
|---|---|---|
| CN | 103167093 A | 6/2013 |
| DE | 102014204827 A1 | 9/2014 |
| DE | 102014204830 A1 | 9/2014 |
| DE | 102014204834 A1 | 9/2014 |
| EP | 2487610 A2 | 8/2012 |
| EP | 2858018 A1 | 4/2015 |
| EP | 2996053 A1 | 3/2016 |
| EP | 3035214 A1 | 6/2016 |
| EP | 3038002 A1 | 6/2016 |
| EP | 3040885 A1 | 7/2016 |
| WO | WO-2005116851 A2 | 12/2005 |
| WO | WO-2012061162 A1 | 5/2012 |

OTHER PUBLICATIONS

"Refresh CSS Ellipsis When Resizing Container—Stack Overflow," Jul. 31, 2013, retrieved from internet http://stackoverflow.com/questions/17964681/refresh-css-ellipsis-when-res-izing-container, retrieved on May 18, 2015.

"SAP BusinessObjects Explorer Online Help," Mar. 19, 2012, retrieved on Apr. 21, 2016 http://help.sap.com/businessobject/product_guides/boexir4/en/xi4_exp_user—_en.pdf.

Amnet, "5 Great Tools for Visualizing Your Twitter Followers," posted Aug. 4, 2010, http://www.amnetblog.com/component/content/article/115-5-grate-t-ools-for-visualizing-your-twitter-followers.html.

Appacts, "Smart Thinking for Super Apps," <http://www.appacts.com> Printed Jul. 18, 2013 in 4 pages.

Apsalar, "Data Powered Mobile Advertising," "Free Mobile App Analytics" and various analytics related screen shots <http://apsalar.com> Printed Jul. 18, 2013 in 8 pages.

Capptain—Pilot Your Apps, <http://www.capptain.com> Printed Jul. 18, 2013 in 6 pages.

Celik, Tantek, "CSS Basic User Interface Module Level 3 (C553 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.

(56) References Cited

OTHER PUBLICATIONS

Chaudhuri et al., "An Overview of Business Intelligence Technology," Communications of the ACM, Aug. 2011, vol. 54, No. 8.
Cohn, et al., "Semi-supervised clustering with user feedback," Constrained Clustering: Advances in Algorithms, Theory, and Applications 4.1 (2003): 17-32.
Countly Mobile Analytics, <http://count.ly/> Printed Jul. 18, 2013 in 9 pages.
Distimo—App Analytics, <http://www.distimo.com/app-analytics> Printed Jul. 18, 2013 in 5 pages.
Flurry Analytics, <http://www.flurry.com/> Printed Jul. 18, 2013 in 14 pages.
Gill et al., "Computerised Linking of Medical Records: Methodological Guidelines,".
Google Analytics Official Website—Web Analytics & Reporting, <http://www.google.com/analytics.index.html> Printed Jul. 18, 2013 in 22 pages.
Gorr et al., "Crime Hot Spot Forecasting: Modeling and Comparative Evaluation", Grant 98-IJ-CX-K005, May 6, 2002, 37 pages.
Gu et al., "Record Linkage: Current Practice and Future Directions," Jan. 15, 2004, pp. 32.
Hansen et al., "Analyzing Social Media Networks with NodeXL: Insights from a Connected World", Chapter 4, pp. 53-67 and Chapter 10, pp. 143-164, published Sep. 2010.
Hua et al., "A Multi-attribute Data Structure with Parallel Bloom Filters for Network Services", HiPC 2006, LNCS 4297, pp. 277-288, 2006.
Janssen, Jan-Keno, "Wo bist'n du?—Googles Geodienst Latitude," Jan. 17, 2011, pp. 86-88, retrieved from the internet on Jul. 30, 2015 http://www.heise.de/artikel-archiv/ct/2011/03/086/@00250@/ct.11.03.086-08-8.pdf.
Keylines.com, "An Introduction to KeyLines and Network Visualization," Mar. 2014, <http://keylines.com/wp-content/uploads/2014/03/KeyLines-White-Paper.p—df> downloaded May 12, 2014 in 8 pages.
Keylines.com, "KeyLines Datasheet," Mar. 2014, <http://keylines.com/wp-content/uploads/2014/03/KeyLines-datasheet.pd—> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.p—df> downloaded May 12, 2014 in 10 pages.
Kontagent Mobile Analytics, <http://www.kontagent.com/> Printed Jul. 18, 2013 in 9 pages.
Localytics—Mobile App Marketing & Analytics, <http://www.localytics.com/> Printed Jul. 18, 2013 in 12 pages.
Manno et al., "Introducing Collaboration in Single-user Applications through the Centralized Control Architecture," 2010, pp. 10.
Mixpanel—Mobile Analytics, <https://mixpanel.com/> Printed Jul. 18, 2013 in 13 pages.
Notice of Allowance for U.S. Appl. No. 14/225,084 dated May 4, 2015.
Notice of Allowance for U.S. Appl. No. 14/319,161 dated May 4, 2015.
Notice of Allowance for U.S. Appl. No. 14/323,935 dated Oct. 1, 2015.
Notice of Allowance for U.S. Appl. No. 14/479,863 dated Mar. 31, 2015.
Notice of Allowance for U.S. Appl. No. 14/483,527 dated Apr. 29, 2016.
Notice of Allowance for U.S. Appl. No. 14/552,336 dated Nov. 3, 2015.
Notice of Allowance for U.S. Appl. No. 14/746,671 dated Jan. 21, 2016.
Notice of Allowance for U.S. Appl. No. 14/858,647 dated Mar. 4, 2016.
Official Communication for European Patent Application No. 14187996.5 dated Feb. 19, 2016.
Official Communication for European Patent Application No. 14187996.5 dated Feb. 12, 2015.
Official Communication for European Patent Application No. 14191540.5 dated May 27, 2015.
Official Communication for European Patent Application No. 14200246.8 dated May 29, 2015.
Official Communication for European Patent Application No. 14200298.9 dated May 13, 2015.
Official Communication for European Patent Application No. 15181419.1 dated Sep. 29, 2015.
Official Communication for European Patent Application No. 15184764.7 dated Dec. 14, 2015.
Official Communication for European Patent Application No. 15200073.3 dated Mar. 30, 2016.
Official Communication for European Patent Application No. 15201924.6 dated Apr. 25, 2016.
Official Communication for European Patent Application No. 16152984.7 dated Mar. 24, 2016.
Official Communication for Great Britain Patent Application No. 1404499.4 dated Aug. 20, 2014.
Official Communication for Great Britain Patent Application No. 1404499.4 dated Jun. 11, 2015.
Official Communication for Great Britain Patent Application No. 1404489.5 dated Aug. 27, 2014.
Official Communication for Great Britain Patent Application No. 1404486.1 dated May 21, 2015.
Official Communication for Great Britain Patent Application No. 1404499.4 dated Sep. 29, 2014.
Official Communication for Great Britain Patent Application No. 1404486.1 dated Aug. 27, 2014.
Official Communication for Great Britain Patent Application No. 1404489.5 dated Oct. 6, 2014.
Official Communication for Great Britain Patent Application No. 1404489.5 dated May 21, 2015.
Official Communication for Netherlands Patent Application No. 2012417 dated Sep. 18, 2015.
Official Communication for Netherlands Patent Application No. 2012421 dated Sep. 18, 2015.
Official Communication for Netherlands Patent Application No. 2012438 dated Sep. 21, 2015.
Official Communication for New Zealand Patent Application No. 622473 dated Mar. 27, 2014.
Official Communication for New Zealand Patent Application No. 622513 dated Apr. 3, 2014.
Official Communication for New Zealand Patent Application No. 622473 dated Jun. 19, 2014.
Official Communication for New Zealand Patent Application No. 628161 dated Aug. 25, 2014.
Official Communication for U.S. Appl. No. 13/827,491 dated Dec. 1, 2014.
Official Communication for U.S. Appl. No. 13/827,491 dated Oct. 9, 2015.
Official Communication for U.S. Appl. No. 13/827,491 dated Jun. 22, 2015.
Official Communication for U.S. Appl. No. 14/141,252 dated Oct. 8, 2015.
Official Communication for U.S. Appl. No. 14/141,252 dated Apr. 14, 2016.
Official Communication for U.S. Appl. No. 14/225,006 dated Dec. 21, 2015.
Official Communication for U.S. Appl. No. 14/225,006 dated Feb. 27, 2015.
Official Communication for U.S. Appl. No. 14/225,006 dated Sep. 2, 2015.
Official Communication for U.S. Appl. No. 14/225,006 dated Sep. 10, 2014.
Official Communication for U.S. Appl. No. 14/225,084 dated Feb. 26, 2016.
Official Communication for U.S. Appl. No. 14/225,084 dated Feb. 20, 2015.
Official Communication for U.S. Appl. No. 14/225,084 dated Sep. 2, 2014.
Official Communication for U.S. Appl. No. 14/225,084 dated Sep. 11, 2015.

(56) References Cited

OTHER PUBLICATIONS

Official Communication for U.S. Appl. No. 14/225,084 dated Jan. 4, 2016.
Official Communication for U.S. Appl. No. 14/225,160 dated Jan. 25, 2016.
Official Communication for U.S. Appl. No. 14/225,160 dated Aug. 12, 2015.
Official Communication for U.S. Appl. No. 14/225,160 dated Jul. 29, 2014.
Official Communication for U.S. Appl. No. 14/225,160 dated May 20, 2015.
Official Communication for U.S. Appl. No. 14/225,160 dated Feb. 11, 2015.
Official Communication for U.S. Appl. No. 14/225,160 dated Oct. 22, 2014.
Official Communication for U.S. Appl. No. 14/225,160 dated Apr. 22, 2016.
Official Communication for U.S. Appl. No. 14/225,160 dated Jun. 16, 2016.
Official Communication for U.S. Appl. No. 14/306,138 dated Dec. 24, 2015.
Official Communication for U.S. Appl. No. 14/306,138 dated Dec. 3, 2015.
Official Communication for U.S. Appl. No. 14/306,147 dated Dec. 24, 2015.
Official Communication for U.S. Appl. No. 14/319,161 dated Jan. 23, 2015.
Official Communication for U.S. Appl. No. 14/319,765 dated Feb. 1, 2016.
Official Communication for U.S. Appl. No. 14/451,221 dated Oct. 21, 2014.
Official Communication for U.S. Appl. No. 14/463,615 dated Sep. 10, 2015.
Official Communication for U.S. Appl. No. 14/463,615 dated Dec. 9, 2015.
Official Communication for U.S. Appl. No. 14/463,615 dated May 21, 2015.
Official Communication for U.S. Appl. No. 14/463,615 dated Nov. 13, 2014.
Official Communication for U.S. Appl. No. 14/463,615 dated Jan. 28, 2015.
Official Communication for U.S. Appl. No. 14/479,863 dated Dec. 26, 2014.
Official Communication for U.S. Appl. No. 14/483,527 dated Jun. 22, 2015.
Official Communication for U.S. Appl. No. 14/483,527 dated Jan. 28, 2015.
Official Communication for U.S. Appl. No. 14/483,527 dated Oct. 28, 2015.
Official Communication for U.S. Appl. No. 14/552,336 dated Jul. 20, 2015.
Official Communication for U.S. Appl. No. 14/562,524 dated Sep. 14, 2015.
Official Communication for U.S. Appl. No. 14/562,524 dated Nov. 10, 2015.
Official Communication for U.S. Appl. No. 14/571,098 dated Feb. 23, 2016.
Official Communication for U.S. Appl. No. 14/571,098 dated Aug. 24, 2015.
Official Communication for U.S. Appl. No. 14/571,098 dated Aug. 5, 2015.
Official Communication for U.S. Appl. No. 14/571,098 dated Nov. 10, 2015.
Official Communication for U.S. Appl. No. 14/571,098 dated Mar. 11, 2015.
Official Communication for U.S. Appl. No. 14/631,633 dated Sep. 10, 2015.
Official Communication for U.S. Appl. No. 14/676,621 dated Oct. 29, 2015.
Official Communication for U.S. Appl. No. 14/676,621 dated Jul. 30, 2015.
Official Communication for U.S. Appl. No. 14/746,671 dated Nov. 12, 2015.
Official Communication for U.S. Appl. No. 14/800,447 dated Dec. 10, 2015.
Official Communication for U.S. Appl. No. 14/813,749 dated Sep. 28, 2015.
Official Communication for U.S. Appl. No. 14/813,749 dated Apr. 8, 2016.
Official Communication for U.S. Appl. No. 14/842,734 dated Nov. 19, 2015.
Official Communication for U.S. Appl. No. 14/929,584 dated Feb. 4, 2016.
Official Communication for U.S. Appl. No. 14/929,584 dated May 25, 2016.
Open Web Analytics (OWA), <http://www.openwebanalytics.com/> Printed Jul. 19, 2013 in 5 pages.
Piwik—Free Web Analytics Software. <http://piwik.org/> Printed Jul. 19, 2013 in 18 pages.
Psaltis, Andrew G., "Streaming Data—Designing the Real-Time Pipeline," Jan. 16, 2015, vol. MEAP VO3, pp. 0-12.
Sigrist, et al., "PROSITE, a Protein Domain Database for Functional Characterization and Annotation," Nucleic Acids Research, 2010, vol. 38, pp. D161-D166.
StatCounter—Free Invisible Web Tracker, Hit Counter and Web Stats, <http://statcounter.com/> Printed Jul. 19, 2013 in 17 pages.
TestFlight—Beta Testing on the Fly, <http://testflightapp.com/> Printed Jul. 18, 2013 in 3 pages.
Trak.io <http://trak.io/> printed Jul. 18, 2013 in 3 pages.
UserMetrix, <http://usermetrix.com/android-analytics> printed Jul. 18, 2013 in 3 pages.
Valentini et al., "Ensembles of Learning Machines", M. Marinaro and R. Tagliaferri (Eds.): WIRN VIETRI 2002, LNCS 2486, pp. 3-20.
Vose et al., "Help File for ModelRisk Version 5," 2007, Vose Software, pp. 349-353. [Uploaded in 5 Parts].
Wang et al., "Research on a Clustering Data De-Duplication Mechanism Based on Bloom Filter," IEEE 2010, 5 pages.
Wikipedia, "Multimap," Jan. 1, 2013, https://en.wikipedia.org/w/index.php?title=Multimap&oldid=530800748.
Wikipedia, "Mobile Web," Jan. 23, 2015, retrieved from the internet on Mar. 15, 2016 https://en.wikipedia.org/w/index.php?title=Mobile_Web&oldid=643800164.
Windley, Phillip J., "The Live Web: Building Event-Based Connections in the Cloud," Dec. 21, 2011, pp. 10, 216.
Winkler, William E., "Bureau of the Census Statistical Research Division Record Linkage Software and Methods for Merging Administrative Lists," Statistical Research Report Series No. RR2001/03, Jul. 23, 2001,https://www.census.gov/srd/papers/pdf/rr2001-03.pdf, retrieved on Mar. 9, 2016.

* cited by examiner

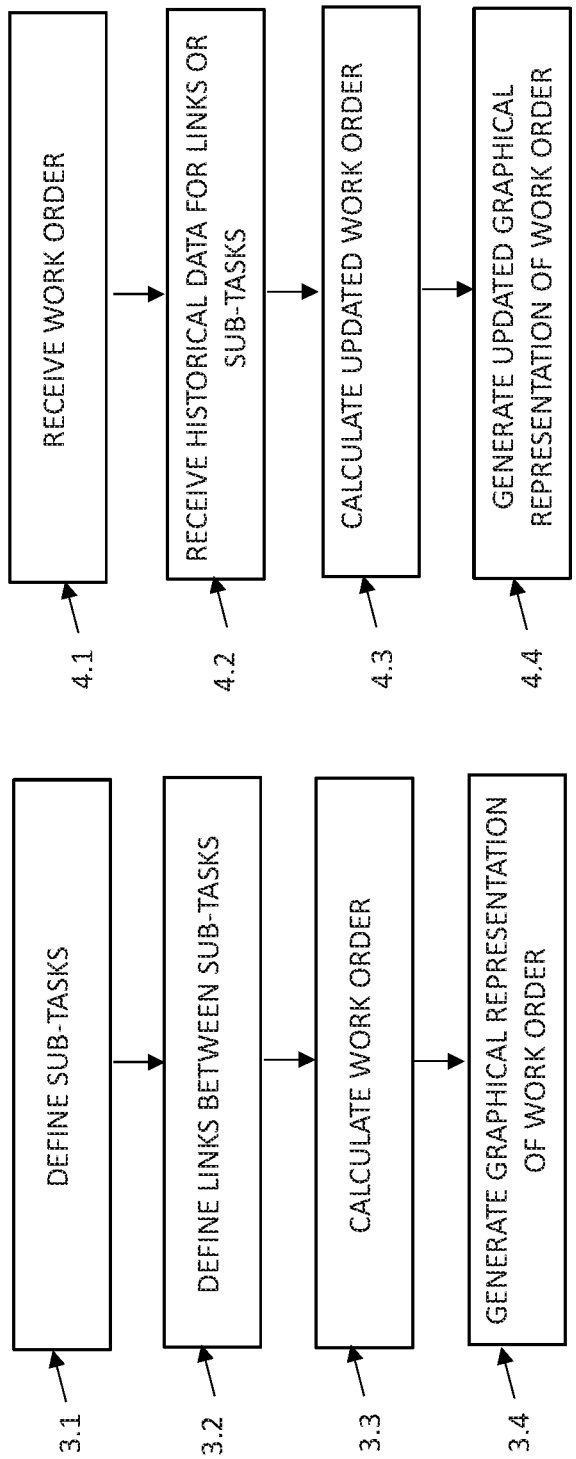

| Location | Hull Assembly Line | ~502 |
| Serial Number | 01 | ~504 |
| Assembly Line Station | Station 40 | ~506 |

| Sub-Task ID | 1.1 | ~508 |
| Description | Assemble Front Hull | ~510 |
| Start Date | 01/01/2017 | ~512 |
| Complete Date | 30/01/2017 | ~514 |

Upstream Dependencies ~516  
Select from List   Add ~518  
Components Available  
Notes: click to add ~524

Downstream Dependencies ~520  
Select from List   Add ~522  
1.3 Install Hydraulic Components on Front Hull ~526  
Notes: click to add Save ~530   Cancel ~532

| Location | Hull Assembly Line |
| Serial Number | 01 |
| Assembly Line Station | Station 40 |

| Sub-Task ID | 1.5.1 | —508 |
| Description | Install Hyd. Elec. Comp. on Front | —510 |
| Start Date | 01/03/2017 | —512 |
| Complete Date | 12/03/2017 | —514 |

Upstream Dependencies

Select from List  Add 1.3 Install Hydraulic Components on Front Hull
Notes: click to add Downstream Dependencies Select from List  Add 1.7 Test
Notes: click to add Save  Cancel

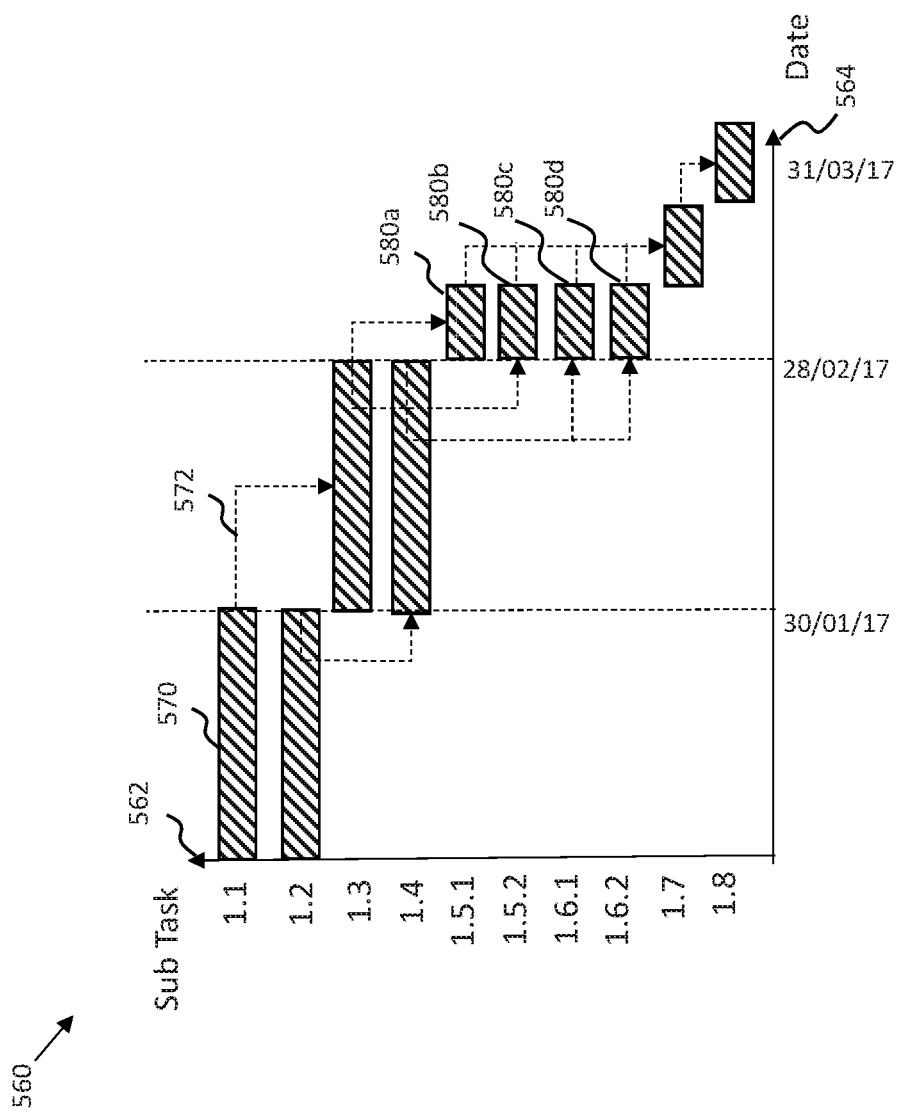

Fig. 10

Location: Hull Assembly Line
Serial Number: 01
Assembly Line Station: Station 40

Sub-Task ID: 1.5.1
Description: Install Hyd. Elec. Comp. on Front
Start Date: 01/03/2017
Complete Date: 12/03/2017

Upstream Dependencies
Select from List  Add
1.1 Assemble Front Hull
Notes: click to add — 524

Downstream Dependencies
Select from List  Add

Notes — 592  594
Author: MH
Date: 15/01/2017
Possible to start electrical installation at same time as hydraulic component installation. No problems encountered.
596

Save  Cancel — 598  599
to add

Save  Cancel 550
590

| | |
|---|---|
| Location | Hull Assembly Line |
| Serial Number | 01 |
| Assembly Line Station | 40 |

550

| | |
|---|---|
| Sub-Task ID | 1.5.1 |
| Description | Install Hyd. Elec. Comp. on Front |
| Start Date | 01/03/2017 |
| Complete Date | 12/03/2017 |

Upstream Dependencies

Select from List  Add 1.1 Assemble Front Hull
Notes: click to add  560
15/01/2017  MH  View Downstream Dependencies Select from List  Add 1.7 Testing
Notes: click to add Save  Cancel

*Fig. 11*

| | |
|---|---|
| Location | Hull Assembly Line → |
| Serial Number | SNM 01 → |
| Assembly Line Station | Station 40 → |
| | |
| Sub-Task ID | 1.5.2 |
| Description | Install Engine Electricals Front |
| Start Date | 01/03/2017 |
| Complete Date | 12/03/2017 |

Upstream Dependencies 516

Select from List → Add 630

1.5.1 Install Hyd. Elec. Comp. on Front
Notes: click to add
15/01/2017 MH View

Downstream Dependencies

Select from List → Add 1.7 Test
Notes: click to add

Save Cancel

| Location | Hull Assembly Line |
| Serial Number | 01 |
| Assembly Line Station | Station 40 |

| Sub-Task ID | 1.5.2 |
| Description | Install Engine Electricals Front |
| Start Date | 01/03/2017 |
| Complete Date | 12/03/2017 |

Upstream Dependencies
[Select from List] [Add]

1.5.1 Install Hyd. Elec. Co...
Notes: click to add
15/01/2017  MH  View

Downstream Dependencies
[Select from List] [Add]

[Save] [Cancel]

592  594
Notes
Author: MH
Date: 15/01/2017

596
On front hull only, engine electricals cannot be done until hydraulic electricals finished due to structural layout.

[Save] [Cancel]

590 ck to add

Fig. 14

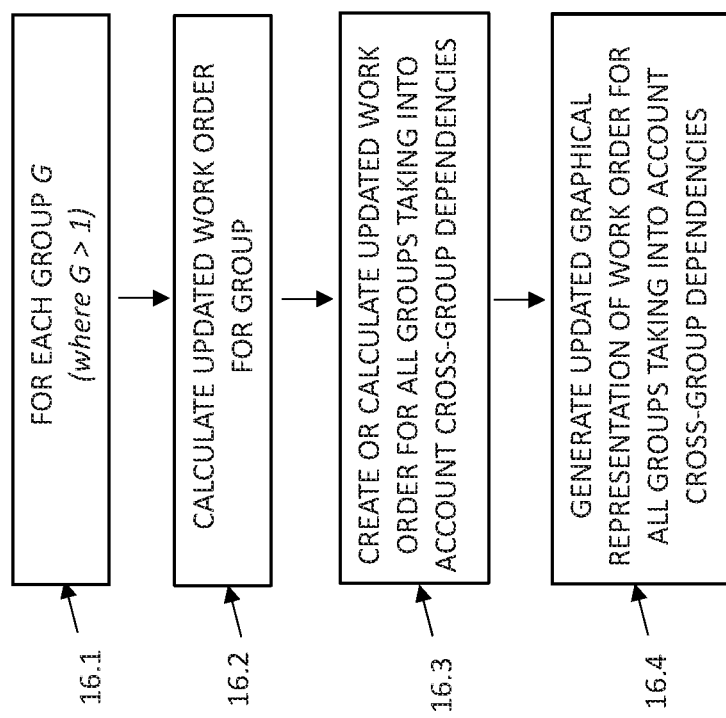

GRAPHICAL REPRESENTATION OF A COMPLEX TASK

CROSS REFERENCE TO RELATED APPLICATIONS

This application is a continuation of U.S. patent application Ser. No. 15/459,811, filed Mar. 15, 2017, which claims the benefit under 35 U.S.C. § 119(e) of U.S. Provisional Application Ser. No. 62/421,013 filed Nov. 11, 2016, the content of which is incorporated by reference in its entirety into the present disclosure.

TECHNICAL FIELD

This disclosure relates to complex tasks, particularly to methods and systems for providing a graphical representation of a complex task, for example in product manufacture.

BACKGROUND

The manufacture of products and systems typically involves collaboration between members of a project, and sometimes multiple project teams which may be part of the same or a different company. Sometimes, different members of a project or different project teams may be geographically remote from one another. Tasks such as planning, designing, manufacturing, testing and/or deploying a product or system may themselves be divided into multiple tasks (or sub-elements) some of which may be performed independently of other tasks and some of which may be dependent on the completion of other tasks.

A complex task may be defined generally as a task (e.g. a project or build) involving sub-elements, one or some of which are dependent on one or more other tasks or sub-elements.

For example, a first team or company may be responsible for a first task, e.g. producing a first component or system, and another team or company may be responsible for a second task, e.g. producing a second component or system. The first and second tasks may be performed in parallel, or one task may need the other to be completed before it can begin. A third task may involve integrating the first and second components or systems at a later time, therefore requiring the first and second tasks to be completed in advance.

Project management is a term that may be used to describe the planning and management of complex tasks, an important part of which is scheduling. Some project management tools are known. One such example is a Gantt chart which is a type of chart used to illustrate scheduling and/or resource allocation for tasks. Typically, a Gantt chart comprises a list of tasks shown in relation to a time-line. Tasks to be performed over a particular portion of the time-line are indicated on the chart as bars or using similar graphics.

Sometimes, tasks and/or sub-elements may not be scheduled appropriately based on a current state. Elements involved in a task and/or sub-element may change over time. Practical lessons learned during an iteration of a task or sub-element may not be propagated to a subsequent iteration, leading to problems and/or inefficiencies.

SUMMARY

In various embodiments, a method performed by one or more processors comprises storing data representing respective sub-elements of a complex task. Data representing one or more links between two or more sub-elements is stored, the links indicating a dependency between said sub-elements. A work order is calculated based on the identified links. A graphical representation of the calculated work order which indicates said sub-elements and their dependencies is provided.

In some embodiments, the links may indicate a temporal dependency of a second sub-element on a first sub-element and in which the provided graphical representation presents the temporal relationship of the sub-elements.

In some embodiments, the method may further comprise receiving historical data for association with one or more selected links or sub-elements, which historical data relates to a prior event and which affects the temporal relationship between the sub-elements; calculating an updated work order modified by the historical data; and providing an updated graphical representation of the work order.

In some embodiments, the links may indicate that a second sub-element is temporally dependent on a first sub-element and wherein, responsive to the received historical data indicating that the second sub-element is temporally independent of the first sub-element, the calculating step modifies the work order so that the updated graphical representation shows temporal independence between the first and second sub-elements. The updated graphical representation may change the second sub-element from being shown subsequent to the first sub-element, to being shown in parallel to the first sub-element.

In some embodiments, third and fourth sub-elements may be stored without a temporal dependence of one on the other, and responsive to the received historical data indicating that the fourth sub-element is temporally dependent on the first sub-element, the calculating step may modify the work order so that the updated graphical representation shows the temporal dependence. The updated graphical representation may change the third and fourth sub-elements from being in parallel to the fourth sub-element being subsequent to the first sub-element.

In some embodiments, the historical data may be indicative of a received completion time for one or more sub-elements relative to a planned completion time.

In some embodiments, the historical data may be user feedback data relating to a previous performance of one or more sub-elements, the user feedback data being received through a graphical editing interface. The graphical editing interface may provide a form for indicating a sub-element that is temporally dependent on one or more other sub-elements, and wherein the step of calculating an updated work order is based on changes made to the form.

In some embodiments, the graphical editing interface may provide a free text area for receiving alphanumeric text. The alphanumeric text may be applied to a machine learning tool to derive semantic output which affects the temporal relationship between the sub-elements. Data may be received within the free text area is stored in association with the sub-element and automatically associated with at least one of a user identifier and/or a date.

In some embodiments, data received within the free text area may be stored in association with the sub-element and is accessible by means of a link provided on the graphical editing interface.

In some embodiments, the calculating step may update the work order to identify one or more conflicts with one or more other sub-elements, and the updated graphical representation may indicate the one or more conflicts. The conflicts may be indicated with a visual link on the updated graphical representation, selection of which opens a window indicating the conflicting sub-elements. The window may permit selection of an option to resolve the conflicting sub-elements automatically using one or more rules. The one or more rules may comprise moving one or more sub-elements temporally to resolve the conflict.

In some embodiments, the method may further comprise providing one or more further graphical representations of the work order in a different format which may be selected by a user.

In various embodiments, an apparatus is provided comprising one or more computers and one or more storage devices storing instructions that are operable, when executed by the one or more computers, to cause the one or more computers to perform operations comprising storing data representing respective sub-elements of a complex task; storing data representing one or more links between two or more sub-elements, the links indicating a dependency between said sub-elements; calculating a work order based on the identified links; and providing a graphical representation of the calculated work order which indicates said sub-elements and their dependencies.

In various embodiments, a non-transitory computer storage medium is encoded with instructions that, when executed by one or more computers, cause one or more computers to perform operations comprising storing data representing respective sub-elements of a complex task; storing data representing one or more links between two or more sub-elements, the links indicating a dependency between said sub-elements; calculating a work order based on the identified links; and providing a graphical representation of the calculated work order which indicates said sub-elements and their dependencies.

BRIEF DESCRIPTION OF THE DRAWINGS

FIG. 3 is a flow chart illustrating an example of a method for complex task scheduling according to embodiments.

FIG. 4 is a flow chart illustrating an example of a method for updating complex task scheduling according to embodiments.

FIG. 7 illustrates an example of an editing interface for defining dependencies of a sub-element according to embodiments.

FIG. 8 illustrates an example of an editing interface for defining dependencies of another sub-element according to embodiments.

FIG. 9 illustrates an example of a graphical representation of a work order based on the FIG. 6 hierarchical diagram according to embodiments.

FIG. 10 illustrates an example of an editing interface in which a user note may be added to a sub-element according to embodiments.

FIG. 11 illustrates an example of an editing interface in which a saved user note may be accessed through a link according to embodiments.

FIG. 13 illustrates an example of a graphical representation of a work order in which a different dependency is modified according to embodiments.

FIG. 14 illustrates an example of an editing interface in which a different user note may be added to a sub-element according to embodiments.

FIG. 16 is a flow chat illustrating an example of a method for updating complex task scheduling across multiple groups according to embodiments.

DETAILED DESCRIPTION

Figure 1:
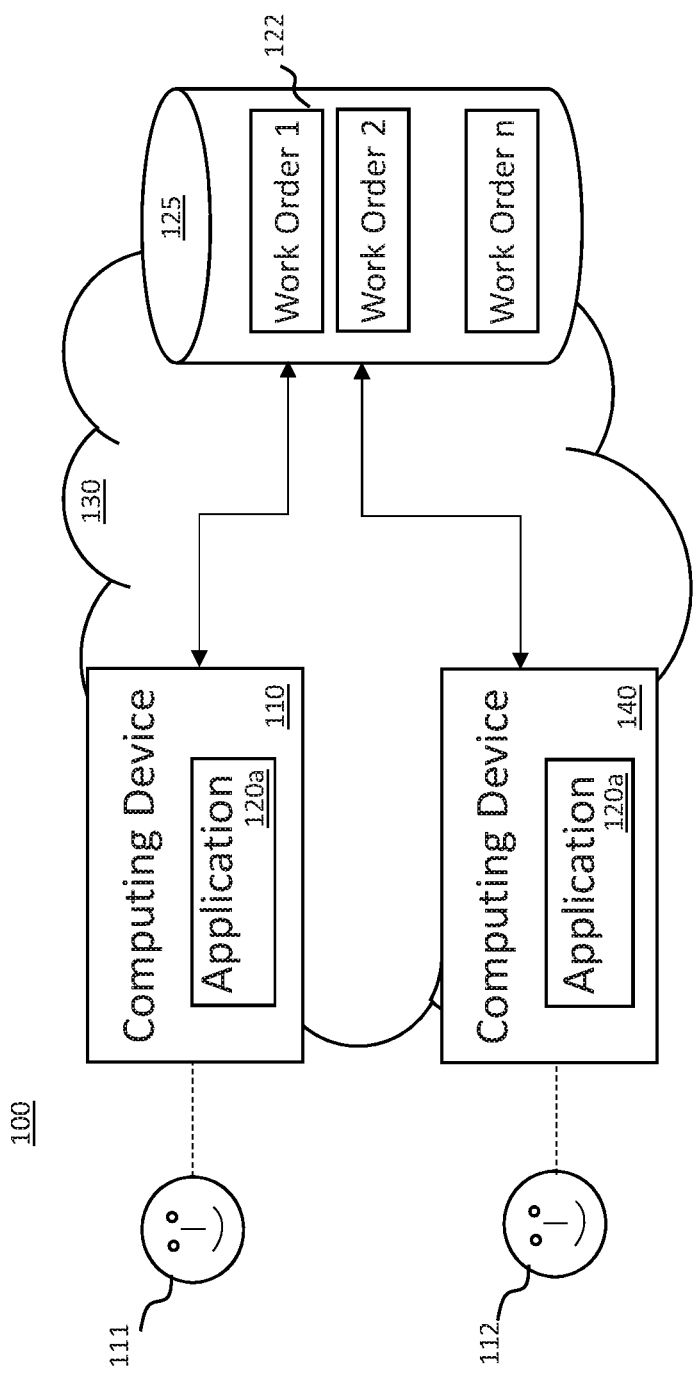
FIG. 1 is a block diagram that illustrates an example of a system that supports complex task scheduling according to embodiments.

In the following description, for the purposes of explanation, numerous specific details are set forth in order to provide a thorough understanding of systems and methods for the improved graphical representation of complex tasks, and in some embodiments, task scheduling. It will be apparent, however, that the present embodiments may be practiced without these specific details. In other instances, well-known structures and devices are shown in block diagram form in order to avoid unnecessarily obscuring the present embodiments.

In general overview, approaches, techniques and mechanisms are disclosed for addressing the above described and other problems.

In an embodiment, a method comprises storing data representing respective sub-elements of a complex task, storing data representing one or more links between two or more sub-elements, the links indicating a dependency between said sub-elements. The method may comprise calculating a work order based on the identified links, and providing a graphical representation of the calculated work order which indicates said sub-elements and their dependencies.

Dependencies may be upstream dependencies or downstream dependencies. An upstream dependency refers to a sub-element that needs to be completed before a current sub-element may be performed. A downstream dependency refers to a sub-element that requires the current sub-element to be performed beforehand. Dependencies may be referred to an internal and external dependencies in both cases. Internal dependencies may be within the scope of a current project or group, whereas external dependencies may be outside the scope of a current project or group.

Some embodiments relate to a computerised scheduling method for generating a graphical representation and/or scheduling a complex task.

Some embodiments relate to software providing a task scheduling tool. The software, when executed by one or more processors of a computer system, may present a graphical representation of a task schedule which includes links indicating a dependency between said sub-elements. The software may provide one or more further graphical representations based on the task schedule. The graphical representation may be interactive, in that a user may switch or alternate between different graphical representations and/ or may drill down into individual sub-elements, links and other graphical fields to edit, comment and/or view further information.

Embodiments may provide the ability for an updated work order to be generated based on historical data and/or user input.

Historical data is any form of data that relates to a prior event associated with one or more sub-elements, or complex tasks, or an overall work order. For example, historical data may relate to a previous iteration of one or more sub-elements. The historical data may be computer-generated or manually entered and/or may be received from another computer system.

In some embodiments, for example, where a previous iteration of one or more sub-elements determines that completion of the relevant tasks occurs prior to an expected or planned date or time, this historical data may be associated in an update with the one or more sub-elements, and may affect the temporal relationship between them. Similarly, the historical data may determine that completion occurs after an expected or planned date or time.

In some embodiments, users may input historical data for association with a selected link and/or sub-element. The entered historical data may affect the temporal relationship between sub-elements.

Based on the historical data, an updated work order may be generated and an updated graphical representation generated therefrom. Advantageously, therefore, a subsequent iteration of a complex task (or a sub-element of it) may be scheduled (and performed in practice) more efficiently than a previous iteration based on historical data which, for example, may indicate a current state of a task, project or build or information learned from the previous iteration.

The historical data may be entered automatically and/or may be generated and input from an automated system, for example a computer system that records logistics data such as when a delivery of materials or components is made and therefore is available in local storage.

For example, in some embodiments, a current version of the work order may indicate that a second sub-element is dependent on (e.g. completion) of a first sub-element. A user's practical experience in performing the task may be that the second sub-element is not actually dependent and can be performed at least partially in parallel which may offer a time saving. For example, this may result from a change in the way one or each sub-element is performed and/or a change in a physical element which is involved in one or each sub-element. User entry of this information in relation to a sub-element or link may produce or propagate in an updated version of the work order a modified graphical representation which indicates the change.

For example, in some embodiments, a current version of the work order may indicate that first and second sub-elements are independent and can be performed independently of one another. A user's practical experience in performing the second sub-element may be that it is actually dependent the other task in all or some situations. For example, it may be learned in practice that the second sub-element always, or a significant amount of the time, has to be aborted until the first task is complete. User entry of this information may produce or propagate in an updated version of the work order a dependency which subsequently appears in a modified graphical representation.

In some embodiments, users may select a link and/or sub-element, e.g. through a graphical user interface (GUI), which selection may present an editing interface. For example, the editing interface may provide one or more of radio buttons, pull-down menus, free-text editing panes and any similar method of data entry.

In some embodiments, an automated text recognition system, natural language processing technique, or a machine-learning method (for example employing neural networks or similar models) may be applied to data entered into the editing interface, for example text entered in the free-text editing pane, to infer automatically a state and/or modification to be applied to a link and/or sub-element. The inferred state and/or modification may require user approval before being applied and propagated.

In some embodiments, users may enter notes or logbook entries into a free-text editing field or similar, e.g. with dates and/or authoring identities manually or automatically inserted, or select values from a drop-down menu. Users may select specific tasks, one or more properties of the task(s) and/or links to drill down the historical data input, e.g. which may indicate non-conformities and/or problems for the sub-element to allow others to identify easily what problems occurred in the past to help avoid them for subsequent iterations. For example, if a particular component or part is not available for a high fraction of the time when a sub-element is attempted, a new sub-element may be required to check it is available. This may assist with logistics etc. In another example, users may add or correct information, such as particular attributes or properties of a task, at a particular point in time. The added or corrected information may be presented to users for the next iteration, which may enrich, correct, and/or complete the data over time.

TERMS AND DEFINITIONS

For convenience, various embodiments of the techniques described herein are described with respect to terms such as "complex tasks" and "sub-elements". As used herein, a complex task is a task involving one or more sub-elements. A sub-element is therefore a task that forms a constituent part of a complex task.

A task for example can be any one of a planning task, a meeting task, an ordering task, a review task, a manufacturing or assembly task, a testing task, a transportation task, etc., to give a non-exhaustive list of examples. In some embodiments, a task may be neither a complex task nor a sub-element.

A link between two or more sub-elements is any data representation of a dependency relationship between two or more tasks or sub-elements.

A work order is a data representation of tasks or sub-elements. In some embodiments, a work order may be a data representation of tasks or sub-elements in order, e.g., temporal order. It may comprise a list, document or spreadsheet, for example.

A graphical representation of a work order is any two (or more) dimensional representation of the work order suitable for storage on computer memory and/or displayable on an electronic display, such as a computer monitor.

Structural Overview

FIG. 1 is a block diagram that illustrates a system 100 that supports project collaboration, according to one embodiment. System 100 may be any system in which task scheduling applications are utilised, including complex task project management for product or system manufacture.

System 100 comprises a computing device 110 operated in use by a user 111. Computing device 110 in use executes a software application 120a. Software application 120a is a task scheduling application, which may be provided as a stand-alone application for storage and execution on memory of the computing device 110, or in some embodiments can be a cloud-based application which is accessed through a web browser of the computing device 110. Software application 120a allows the user 111 to perform one or more of creating, accessing and modifying one or more work orders 122 which may be stored locally on memory of the computing device 110 and/or which may be stored remotely on a server 125. The software application 120a may further generate from the or each work order 122 a graphical representation of the work order for display on a display monitor or screen.

A work order 122 may be a data file that represents, for a given complex task, one or more sub-elements and a temporal order of the sub-elements to perform the complex task. The work order 122 may be in the form of a list, a document or a spreadsheet, for example.

The server 125 is a computer device connected to the system 100 via a network 130. The network 130 may be, for example, an internet or intranet. The server 125 may be any computing device capable of sharing structured data with computing devices connected to the network 130, including a web server or file server.

In the shown example, a second computer device 140 is shown connected to the network 130. The second computer device 140 is operated in use by a user 112 and in use executes a software application 120a. Connection and operation of the second computer device 140 may be considered the same or largely similar to the first computer device 110, and is shown merely to represent the possibility of multiple users 111, 112 being able to create, access and modify work orders 122 if stored on the server 125.

FUNCTIONAL OVERVIEW AND IMPLEMENTATION EXAMPLES

The software application 120a may be configured to perform the processing steps shown in overview in FIG. 3. FIG. 3 shows method steps in creating a work order and graphical representation of the work order.

In a first step 3.1, a plurality of sub-elements is defined for a particular task, project or build (collectively "task"). These may be manually entered by a user. In a second step 3.2, one or more links representing a dependency relationship between two or more of the sub-elements are defined. Again, these may be manually entered by a user. In a third step 3.3, a work order is calculated using the defined sub-elements and the links. In a fourth step, a graphical representation of the work order is generated. The defined sub-elements, links, work order and graphical representation may be stored locally and/or remotely on the server 125.

The software application 120a may also be configured to perform the processing steps shown in overview in FIG. 4. FIG. 4 shows method steps in updating the work order by means of user inputted data. In a first step 4.1, a work order is received, e.g. from the local storage or the server 125. In a second step 4.2, historical data is received in relation to one or more links and/or sub-elements. The historical data may be manually entered by a user. In a third step 4.3, an updated work order is calculated using the existing data as modified by the historical data. In a fourth step 4.4, an updated graphical representation of the work order is generated.

More detailed examples of the above method steps will now be explained.

Figure 5:
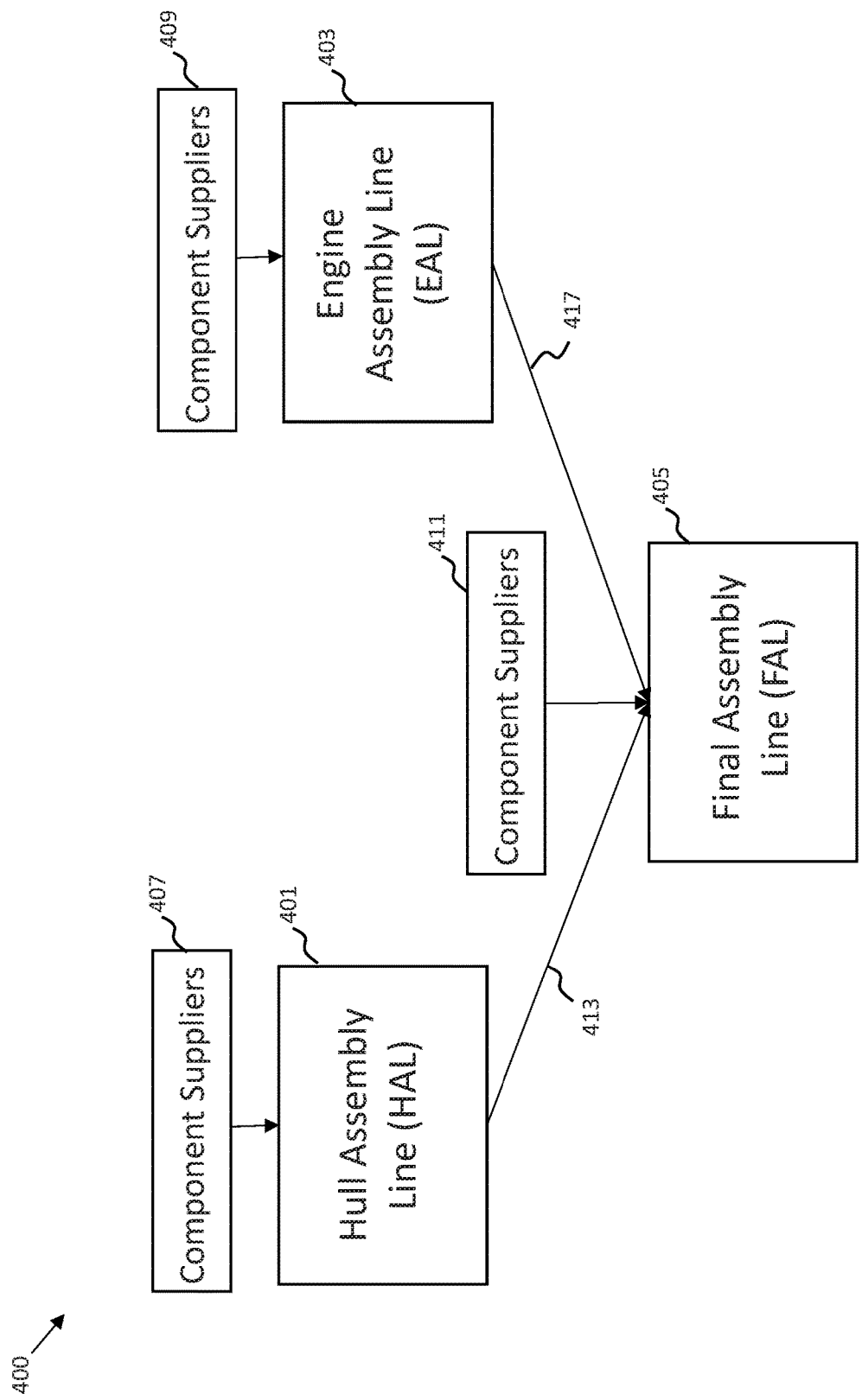
FIG. 5 is a hierarchical diagram illustrating an example of an interrelationship between complex tasks according to embodiments.

FIG. 5 is a schematic view which may represent an example complex task 400. The complex task 400 in this example may be the production of a cargo ship but the same principles may be applied to any complex task, whether in manufacturing or otherwise. For example, the complex task 400 may be one or more of the production of automobiles, aircraft, ships, electronic systems etc. The complex task 400 is broken down into three sub-elements which are a hull assembly line (HAL) sub-element 401, an engine assembly line (EAL) sub-element 403 and a final assembly line (FAL) sub-element 405 for assembling the engine to the hull. Each sub-element 401, 403, 405 may be performed by one or more different teams at one or more different locations. An initial assumption is made that the FAL sub-element 405 is dependent on completion of the HAL and EAL sub-elements 401, 403 because in the FAL sub-element the engine is assembled within the hull. These dependencies are indicated by the arrows 413, 417. It is also assumed that the HAL sub-element 401 and the EAL sub-element 403 are not inter-dependent and may be performed in parallel. For completeness, further sub-elements 407, 409, 411 are indicated to show that each of the HAL, EAL and FAL sub-elements 401, 403, 405 are dependent on components being available at each respective site in order for the relevant work to be performed.

Figure 6:
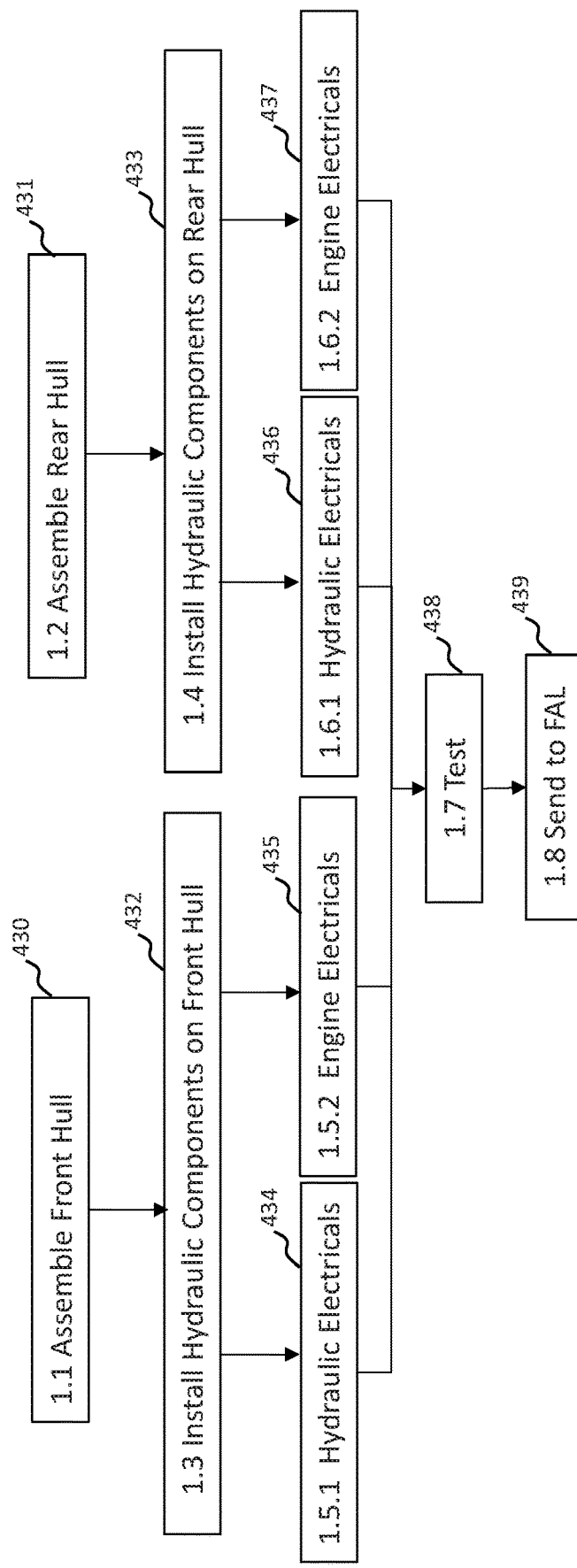
FIG. 6 is a hierarchical diagram illustrating an example of an interrelationship between sub-elements of a complex task (e.g., as illustrated in FIG. 5).

FIG. 6 is a schematic view which may represent in greater detail sub-elements within the HAL sub-element 401. For this purpose, the HAL sub-element 401 may be considered a complex task. Again, these sub-elements are shown by way of simplified example and it will be appreciated that in practice a much larger number of sub-elements may be performed, and that the same considerations may be applied to the EAL and FAL sub-elements 403, 405.

The complex HAL task 401, as it will be referred to, may be assigned by the system a unique identifier, as may the sub-elements which make up the complex task. The unique identifier(s) may be entered manually and/or generated automatically. In the shown example, a serial number 01 is assigned. Similar identifiers may be assigned to the overall (global) complex task 400 shown in FIG. 5, and the sub-elements within it. Further identifiers may be provided under the unique identifier, for example to indicate a location, a work zone or station within the location, and/or a specific team of workers. In the shown example, a station number 40 is assigned. Any form of identification means or system may be provided in any format, provided that the identifiers may be resolved by a computer system to group them appropriately.

A first sub-element 430 may be the assembly of the front hull, denoted by the internal task code 1.1. In this example, we assume that the hull of the cargo ship is formed of separate front and rear hull sections. A second sub-element 431 may be the assembly of the rear hull, denoted by the internal task code 1.2. It may be initially assumed that the first and second sub-elements 430, 431 may be performed by respective different teams in parallel.

A third sub-element 432 may be the installation of hydraulic components on the front hull, denoted by the internal task code 1.3. A fourth sub-element 433 may be the installation of hydraulic components on the rear hull, denoted by the internal task code 1.4. It may be initially assumed that the third and fourth sub-elements 432, 433 may be performed by respective teams in parallel.

A fifth sub-element 434 may be the installation of the electrical system (electricals) for the front hull hydraulic components, denoted by the internal task code 1.5.1. A sixth sub-element 435 may be the installation of the electricals for the front hull engine, denoted by the internal task code 1.5.2. A seventh sub-element 436 may be the installation of the electrical system (electricals) for the rear hull hydraulic components, denoted by the internal task code 1.6.1. An eighth sub-element 4437 may be the installation of the electricals for the rear hull engine, denoted by the internal task code 1.6.2. It may be initially assumed that the fifth to eighth sub-elements 434-437 may be performed by respective teams in parallel.

A ninth sub-element 438 may be the testing of the electricals for both the front and rear hull sections, denoted by the internal task code 1.7. It may be initially assumed that the ninth sub-element 438 is performed by a specialist team and is dependent on completion of the fifth to eighth sub-elements 434-437.

A tenth sub-element 439 may be the sending or transportation of the assembled and tested front and rear hulls to the FAL, denoted by the internal task code 1.8. It may be initially assumed that the tenth sub-element 439 is dependent on completion of the ninth sub-element 439.

It will therefore be appreciated that a relatively logical and symmetrical hierarchy of sub-elements 430-439 is assumed. It may be the case however that through practical performance of the complex task 401 (and/or one or more of the sub-elements 430-439) over one or more iterations that efficiencies or potentially problematic issues may arise. The presently-described system and method is directed at highlighting and/or resolving such issues, which may be performed in an intuitive and graphical manner.

Data representing the FIG. 5 and FIG. 6 complex tasks may be entered using one or more methods. For example, each complex task may be entered using one or more of a database, a spreadsheet or a dedicated editing interface or form that permits user entry of information which may comprise one or more of the identifier(s), names and descriptions, locations, dates and times, and dependencies, to give a non-exhaustive list. For example, the editing interface may provide one or more of radio buttons, pull-down menus, free-text editing panes and any similar method of data entry.

In some embodiments, FIGS. 5 and 6 may be a graphical representation of a work order for a complex task, albeit one without a date or time reference, because it indicates the sub-elements and their dependencies.

The system and methods described herein may permit various different forms of graphical representation to be computed. The system and methods herein may permit sub-elements and links indicative of dependencies to be selected and, by means of such selection, they may be modified and/or updated which may cause the work order and therefore the graphical representation to be modified automatically. The updating and modification may be performed at the sub-element and complex task level so that changes may be propagated locally and, if appropriate, globally throughout the complex tasks that are affected.

Referring to FIG. 7, an example editing interface 500 is shown for user entry of data for defining the first sub-element 430 shown in FIG. 6.

Within the editing interface 500 may be provided one or more pull-down menus 502, 504, 506 for entering identification information regarding the physical location where the first sub-element 430 may be performed. A first pull-down menu 502 is for selection of the appropriate assembly line from an existing stored list. In the present case, the user may select from the first pull-down menu 502 the Hull Assembly Line. A second pull-down menu 504 is for selection of the appropriate serial number (which may indicate the specific ship) from an existing stored list. In the present case, the user may select from the second pull-down menu 504 the serial number 01. A third pull-down menu 506 is for selection of the appropriate assembly line station from an existing stored list. In the present case, the user may select from the third pull-down menu 506 the Station 40. In some embodiments, users may create a new item for one or more of the pull-down menus 502, 504, 506.

The editing interface 500 may further provide one or more free-text fields 508, 510 for the user entry of a sub-element identifier and/or a description of the sub-element. Additionally, or alternatively, other methods of data entry may be employed. In the present case, the numeral sub-element identifier 1.1 is entered in field 508, and in a separate field 510 a brief description of the sub-element is entered.

The editing interface 500 may further provide one or more date entry fields 512, 514 for the respective entry of planned start and completion dates in any known format, e.g. dd/mm/yyyy or mm/dd/yyyy. The dates may be entered manually or by selecting a calendar pop-up through which selection of a date or range of dates may be selected. In some embodiments, the data entry fields 512, 514 may permit the input of times also.

The editing interface 500 may further provide one or more fields or items for indicating dependencies, for example upstream and/or downstream. For example, a first pull-down menu 516 may permit upstream dependencies to be selected from an existing list. In the shown example, a components available item may be selected and then associated with the first sub-element 430 by selecting the add button 518. For example, a second pull-down menu 520 may permit downstream dependencies to be selected from an existing list. In the shown example, the third sub-element 432 may be selected and associated with the first sub-element 430 by selecting the add button 522.

In some embodiments, multiple dependencies, whether upstream or downstream, may be associated with a sub-element in this manner.

In some embodiments, the editing interface 500 may provide for user notes to be entered, in association with the sub-element itself, or in association with menu elements of the sub-element. For example, each of the upstream and downstream dependency fields 516, 520 may have an associated means 524, 526 for a user to enter notes, for example to explain the reason for the dependency and/or to identify issues that occurred on a previous iteration of the sub-element.

Such notes may be entered using any conventional data entry method. In the editing interface 500, this may be by means of selecting a link 524, 526 which causes the system to open a new data entry field into which free text may be entered and saved. A user identifier and date/time may be associated with the note when saved to provide a traceable history indicating who entered what and when.

A save button 530 and a cancel button 532 are provided for respectively saving and cancelling the data entry. In some embodiments, selection of the save button 530 may automatically propagate changes and/or prompt an action or alert to appear in a resulting graphical representation of the work order.

Referring to FIG. 8, an example editing interface 550 is shown for user entry of data for defining the fifth sub-element 434 shown in FIG. 6. This editing interface 550 may be identical to that shown in FIG. 7, other than different data is entered. In particular, the free text field 508 is inputted with 1.5.1 and the free text field 510 is inputted with the description of the fifth sub-element 434. Different start and completion dates, as appropriate, may be entered in fields 512, 514.

In the example editing interface 550, an initial upstream dependency is selected from the pull-down menu 516, namely the third sub-element with identifier 1.3. This appears beneath the pull-down menu 516. Similarly, on the downstream side, an initial downstream dependency is selected from the pull-down menu 520, namely the ninth sub-element with identifier 1.7.

The save button 520 may be used to save and/or automatically propagate changes and/or prompt an action or alert in a resulting graphical representation of the work order.

Referring to FIG. 9, an example graphical representation 560 of a work order for the complex task 401, which takes as initial data the sub-element values indicated in FIGS. 7 and 8, and similar data for other sub-elements indicated in FIG. 6, is shown. The graphical representation 560 may result from a save operation associated with each editing interface so that changes are updated iteratively.

The graphical representation 560 may be one of a number of possible alternatives for representing sub-elements of a complex task. In some embodiments, the graphical representation 560 may relate to data for multiple complex tasks, although for ease of illustration and explanation, a single complex task is indicated here.

The vertical axis 562 is indicative of the list of sub-elements, for example using their assigned sub-element ID entered in field 508 of the editing interface 500, 550. The sub-element IDs may be arranged in any order, or may be logically arranged by name (e.g. alphanumerically) or order of entry. The horizontal axis 564 is indicative of time, for example in the form of a linear timeline partitioned into days, weeks, months and/or years.

Each sub-element is represented on the graphical representation 560 by a box 570 extending relative to the time axis 564. Alternative representations may be used, for example a simple line may be used instead of a box.

Additionally, dependencies between the boxes 570 are indicated on the graphical representation 56o by arrows 572 or another suitable means, which serve as links. For example, the arrow 572 extending between the third sub-element 1.3 (432) and the first sub-element 1.1 (430) indicate that the former requires the latter to be completed before it can commence. Therefore, the graphical representation 560 provides an immediate and intuitive way of visualizing a schedule for completing each sub-element of a complex task, and which sub-elements may be performed in parallel and which require another sub-element to be completed beforehand.

Additionally, one or more of the sub-element boxes 570 and the dependency links 572 may be selected using the graphical representation, for example by clicking them using a mouse or similar user input device. Responsive to said selection, a properties box may appear on or over the graphical representation 560 and/or an editing interface associated with the selected item may appear for editing.

Referring to FIG. 10, the user may additionally select the link 524 to open a text editing pane 590 for entering comments or notes in free-text form. In some embodiments, the identity of the author 592 and the date/time 594 is automatically or manually entered. The user may type their notes into the free text area 596. A save button 598 and a cancel button 599 are provided for respectively saving and cancelling the entry of notes. As shown in FIG. 10, the user may enter details as to why the modification has been made which may be useful for other users to appreciate why the change was made and by whom it was made.

Referring to FIG. 11 the editing box 550 is shown after the save button 598 is selected. For example, the updated upstream dependency may be shown, as may the saved note which can be viewed by selecting the note link 560.

The same method may be used to add additional notes, which may be performed by any appropriate user. The same method may be used in association with the downstream dependencies to add and/or view notes associated with modifications on this type of dependency.

For example, the same steps may be applied to the sub-element boxes 580*b*, 580*c*, 580*d* associated with the sixth, seventh and eighth sub-elements 435-437 based on the realization that these tasks may likewise have their dependency altered.

Figure 12A:
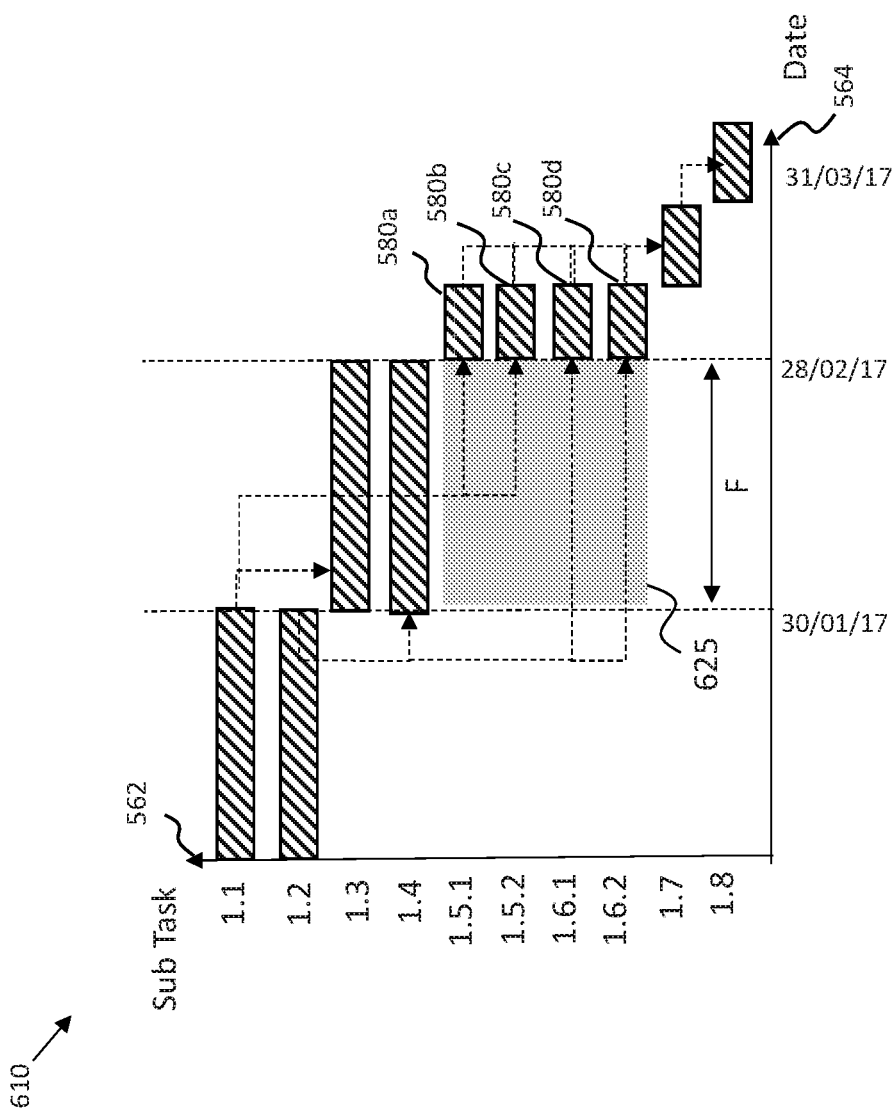
FIG. 12*a* illustrates an example of a graphical representation of a work order, updated from the FIG. 9 example, according to embodiments.

Referring to FIG. 12*a*, an example graphical representation 610 of the work order, resulting from the above-mentioned modifications to sub-element boxes 580*a*-580*d*, is shown. It will be seen that said sub-element boxes 580*a*-580*d* are no longer indicated as dependent on the third and fourth sub-elements 432, 433 but instead are dependent on the first and second sub-elements 430, 431.

Figure 12B:
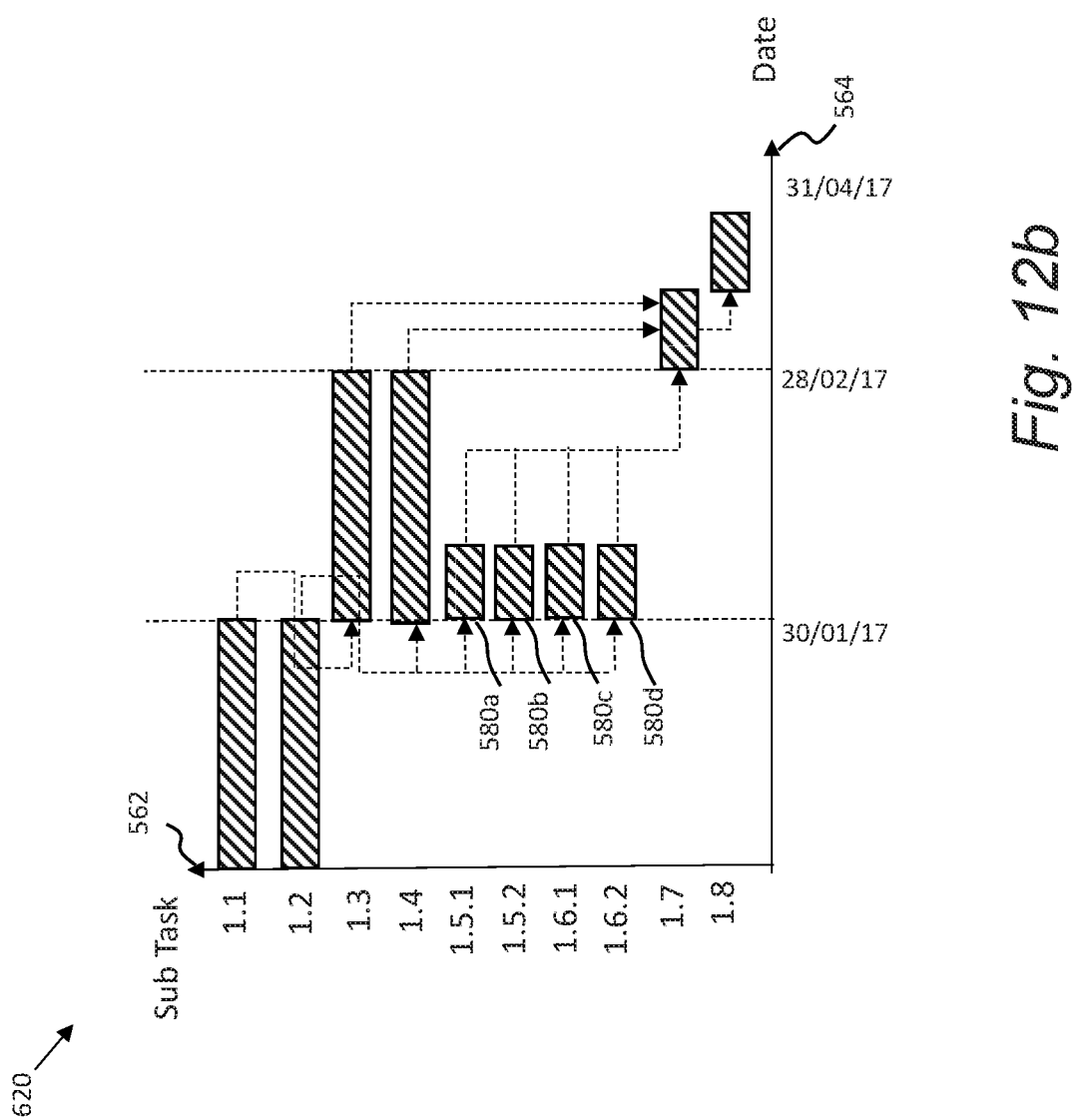
FIG. 12*b* illustrates a further example of a graphical representation of a work order, updated from the FIG. 9 example, according to embodiments.

It will be appreciated that said modifications provide an opportunity to re-schedule sub-elements so that they may be performed more efficiently. The time period F is available to the fifth to eighth sub-elements 434-437, which means these can be brought forward in time as shown in FIG. 13*b* as an updated graphical representation 620. Referring to FIG. 12*b*, it will be seen that the fifth to eighth sub-elements 434-437 may commence in parallel with the third and fourth sub-elements 432, 433. However, the ninth sub-element 438 nevertheless is dependent on the third and fourth sub-elements 432, 433 completing.

A rescheduling possibility may be indicated in graphical form on the graphical representation 610 in whatever form it is generated and presented on the GUI. In FIG. 12*a*, for example, a rescheduling suggestion may be indicated by a box 625 that is shown differently, e.g. in a different color or shade.

In some embodiments, the rescheduling may be performed automatically without user intervention. For example, the graphical representation 620 shown in FIG. 12*b* may be generated responsive to a user saving the relevant editing interface in which they changed the dependency, with the modification propagating through the scheduled times for subsequent sub-elements.

Another example will now be described in which a dependency may be added to one or more sub-elements which was not previously present. In this example, we consider the case where, through previous iterations, it is discovered that the sixth sub-element 435 needs to be performed after the fifth sub-element 434 due, for example, to a structural layout issue on the front hull only.

Returning to FIG. 9, in response to a user selecting the sub-element box 580*b*, the editing interface 550 shown in FIG. 13 is opened, which corresponds to the sixth sub-element 435. In this example, using the steps stated above, the user may modify the upstream dependency using the pull-down menu 516 to indicate a new dependency on the fifth sub-element 434. The new dependency is indicated by reference numeral 630.

Referring to FIG. 14 the user may additionally select the link 524 to open the text editing pane 590 for entering comments or notes in free-text form. In some embodiments, the identity of the author 592 and the date/time 594 when the note is entered is automatically or manually entered. The user may type their notes into the free text area 596. The save button 598 and the cancel button 599 are provided for respectively saving and cancelling the entry of notes. As shown in FIG. 14, the user may enter details as to why the modification has been made which may be useful for other users to appreciate why the change was made and by whom it was made.

Figure 15:
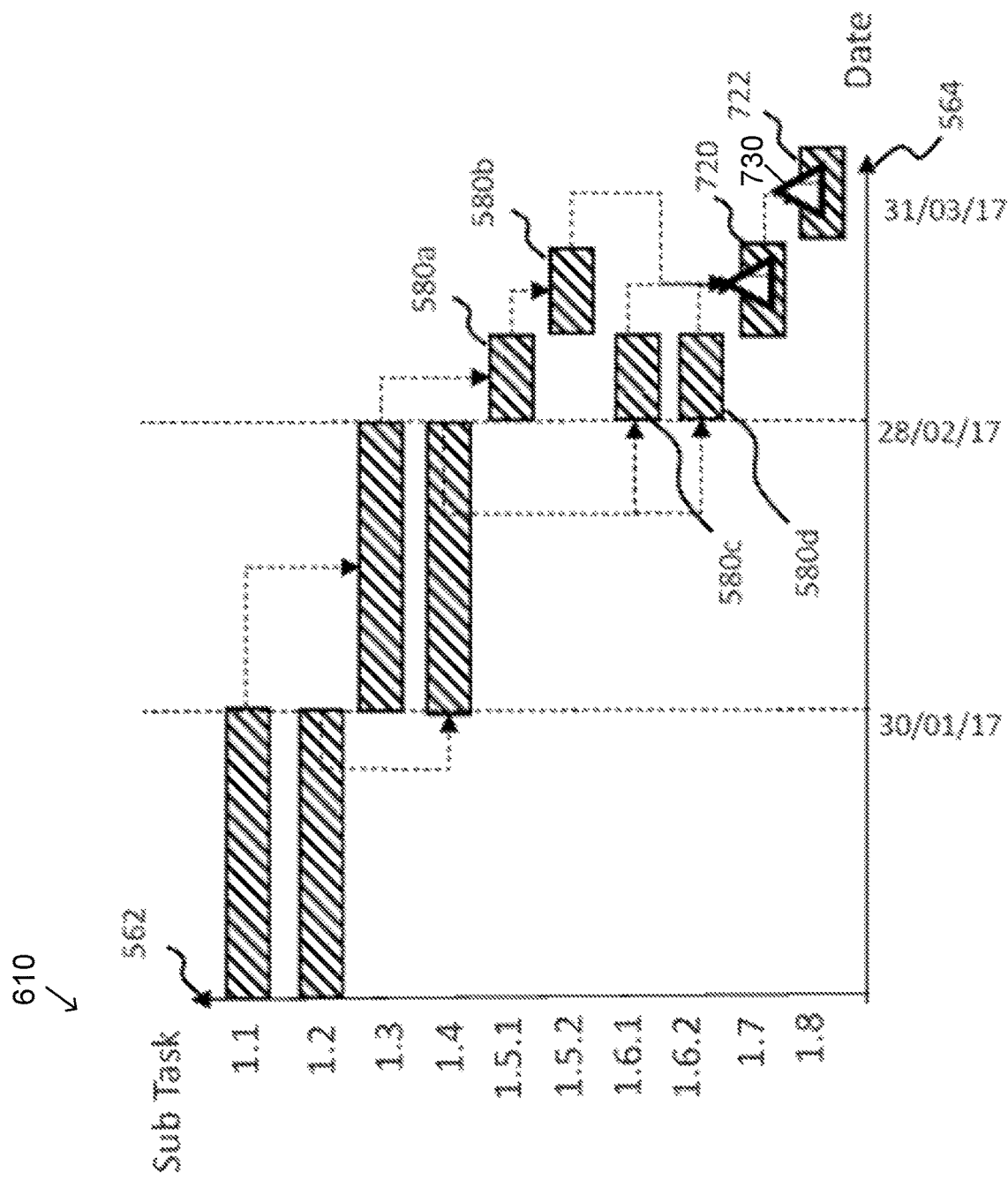
FIG. 15 illustrates an example of a graphical representation of a work order, updated from the FIG. 9 example based on modifications shown in FIG. 13 according to embodiments.

Referring to FIG. 15, an example graphical representation 610 of the work order, resulting from the above-mentioned modification to sub-element box 580b is shown. It will be seen that said sub-element box 580b is now dependent on the sub-element box 580a and cannot be performed in parallel with it.

In consequence, the system may automatically detect a conflict condition resulting from the ninth sub-element 438 (represented by box 720) being downwardly dependent on the moved sixth sub-element 435 but now scheduled in parallel with it. One or more subsequent downstream sub-elements (represented by box 722) may be similarly affected. Accordingly, the system may flag this through a visual alert, e.g. using a visual icon 730 associated with affected sub-elements.

In some embodiments, selection of the visual icon 730 may present through the GUI an indication or description of the conflict for manual resolution. In some embodiments, an automatic modification may be performed to resolve the conflict, e.g. by moving the boxes 720, 722 to a later time in the schedule, with the modification propagating through the scheduled times for subsequent sub-elements.

In some embodiments the above system and methods for scheduling a complex task may be applied for multiple groups G. A group may comprise any number of entities which handle respective sub-elements or complex tasks. For example, there may be multiple work zones, physical locations, users, teams and/or complex tasks (which themselves may be considered sub-elements in the context of a global complex task). Systems and methods for visualizing and updating a work order and presenting the output through a GUI may be propagated for all groups or selected subsets.

FIG. 16 is a flow chart representing an overview of the steps for applying the above-mentioned system and method for multiple groups G. A first step 16.1 indicates that subsequent steps are performed for each group G, either in parallel or one after the other. The next step 16.2 may calculate an updated work order for the respective group G using steps 4.1-4.3 shown in FIG. 4. The next step 16.3 may create or calculate an updated work order for all groups G taking into account cross-group dependencies or relationships. The next step 16.4 may generate an updated graphical representation of a work order for all groups G taking into account said cross-group dependencies or relationships.

Various types of GUI may be generated based on updated work orders as described above to provide immediate and intuitive feedback.

For example, a GUI may be provided as a so-called scheduling view showing a calendar view in relation to a list of 'zones' which may for example be zones of a factory or respective remote locations. A pull-down menu may enable a user to select a sub-set of dates to view. An area may indicate a key, e.g. a color or other visual key, indicating an identifier for distinguishing what is represented on the calendar view. For example, a darker color may be used to represent secondment teams as distinct from a FAL team which may be shown in a lighter color. Such colors or other indicators may be shown in the calendar view which may indicate so-called 'task elements' which may represent sub-elements and their relation to the calendar dates. In the event of the above-mentioned conflicts being identified by means of the updating methods, a visual indicator may be displayed for showing where a conflict may arise.

A visual indicator may be selected by a user on the GUI to open a window which displays details of the sub-elements that are in conflict, and may provide options to proceed, cancel or resolve.

The GUI may further display a list of task elements, or sub-elements, in a separate area which may provide a summary of, for example, task elements scheduled after a to do list and those that are unscheduled.

A GUI may additionally or alternatively be provided showing a calendar or date range in relation to one or more respective locations identified by one or more of their serial number and station. Within the underlying area may be presented task elements (sub-elements) with associated notes and information. Each task element may be selected through the GUI to view respective notes and/or information. In a single platform, users and/or teams may schedule new task elements based on recommended time slots generated by the system, resolve scheduling issues between task elements and/or zones and address flags to avoid blocking work downstream.

A GUI 840 may additionally or alternatively be provided showing a list of task elements (sub-elements) in list form. Each task element 842 may have an associated name, description, zone identifier, to do list and assignment. Further information may be associated with each task element. Selecting a particular task element may open sub-elements that are dependent on the selected task element. Information as to the status of the relevant task element, for example whether it is overdue or unscheduled may be displayed. In some embodiments, selecting a task element may cause display of a sub-window indicating father links showing in hierarchical form the various dependencies of the task element both upstream and downstream.

A GUI 850 may additionally or alternatively be provided for indicating in a single view a priority ordered list of task elements in graphical form. In some embodiments, the GUI may indicate task elements for which there are upcoming technical deadlines.

Hardware Overview

Figure 2:
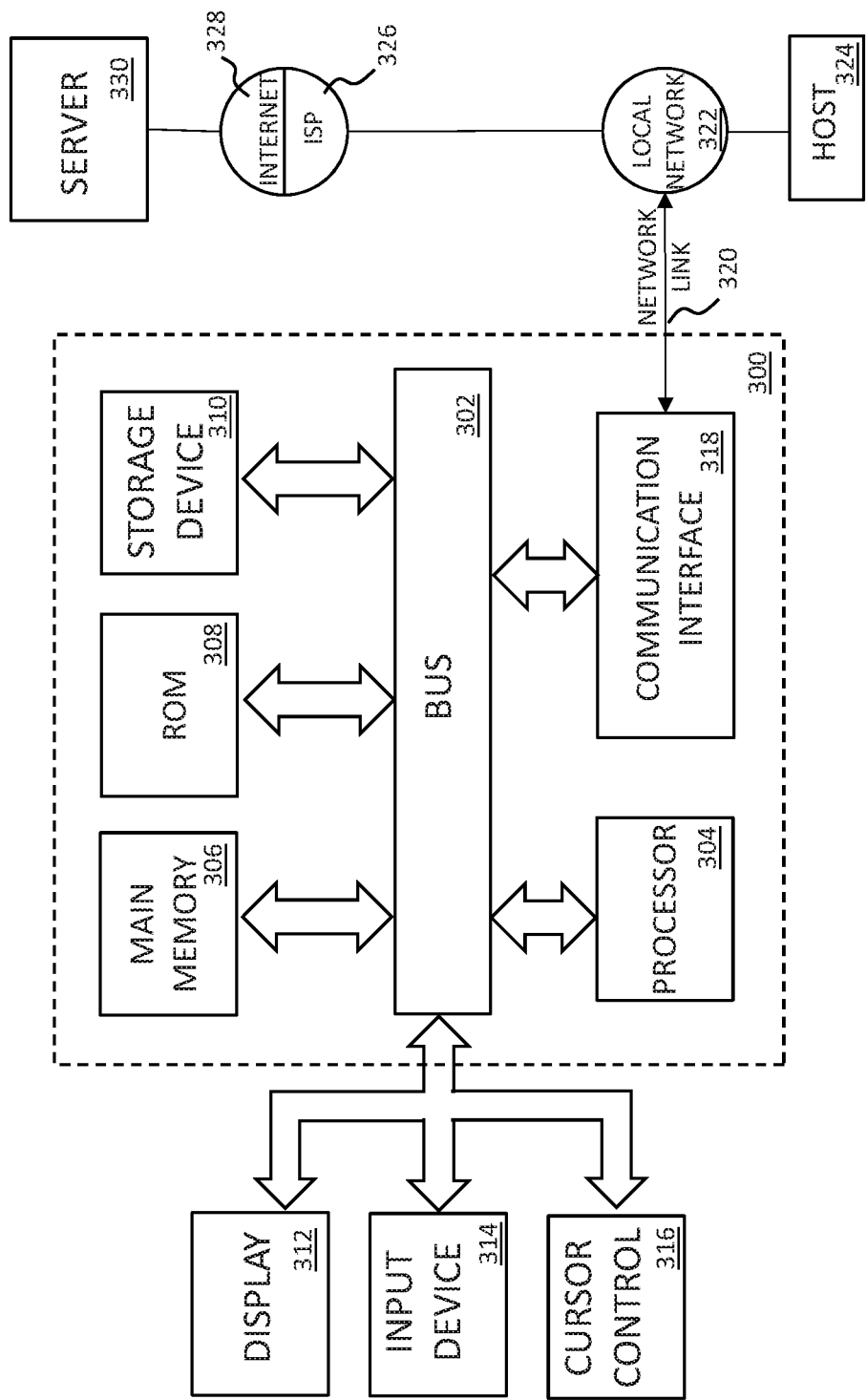
FIG. 2 is a block diagram of an example of a computer system upon which embodiments of the specification may be implemented according to embodiments.

The techniques described herein may be implemented by one or more special-purpose computing devices. The special-purpose computing devices may be hard-wired to perform the techniques, or may include digital electronic devices such as one or more application-specific integrated circuits (ASICs) or fi programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques. For example, FIG. 2 is a block diagram that illustrates a computer system 300 upon which embodiments may be implemented. Computer system 300 includes a bus 302 or other communication mechanism for communicating information, and a hardware processor 304 coupled with bus 302 for processing information. Hardware processor 304 may be, for example, a general purpose microprocessor, microcontroller or plural such devices.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions, including for example the above mentioned application 120a.

Computer system 300 may be coupled via bus 302 to a display 312, such as a cathode ray tube (CRT) or thin film transistor (TFT) monitor, for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane. Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications. Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304. Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. The received code may be executed by processor 304 as it is received, and/or stored in storage device 310, or other non-volatile storage for later execution.

The invention claimed is:

1. A method performed by one or more processors, the method comprising:
storing data representing respective sub-elements of a complex task;
storing data representing one or more links between two or more sub-elements, the links indicating a dependency between said sub-elements, wherein the links indicate a temporal dependency of a second sub-element on a first sub-element;
identifying a change in a performance, or in a physical component, of any of the first sub-element or the second sub-element;

determining, from the identified change, whether the temporal dependency of the second sub-element on the first sub-element has changed, comprising:
receiving an input;
generating, using a neural network, a semantic output from the input;
determining, from the semantic output:
a state of any of the first sub-element and the second sub-element; and
a modification to be applied to a link between the first sub-element and the second sub-element;
in response to determining that the temporal dependency has changed, updating a work order based on the modification; and
providing a graphical representation of the updated work order, the graphical representation comprising:
an ordered list of priorities of the respective sub-elements based on deadlines of the respective sub-elements; or statuses of the respective sub-elements, the statuses indicating whether the respective sub-elements are overdue or unscheduled.

2. The method of claim 1, wherein the determining whether the temporal dependency of the second sub-element on the first sub-element has changed comprises:
determining, from the identified change, whether the second sub-element is temporally dependent on the first sub-element;
in response to determining that the second sub-element is not temporally dependent on the first sub-element, updating the work order to indicate that the first sub-element and the second sub-element are performed at least partially in parallel.

3. The method of claim 1, wherein the determining whether the temporal dependency of the second sub-element on the first sub-element has changed comprises:
determining, from the identified change, whether the second sub-element determined to be previously temporally independent from the first sub-element has become temporally dependent on the first sub-element; and
in response to determining that the second sub-element is now temporally dependent on the first sub-element, updating the work order to indicate that the first sub-element and the second sub-element are performed at least partially in series.

4. The method of claim 1, further comprising:
determining whether a physical component to be used in the first sub-element or the second sub-element is available during at least a threshold portion of a duration or a predicted duration of the first sub-element or the second sub-element; and
in response to determining that the physical component is unavailable for more than the threshold portion, adding a new sub-element to determine an availability of the physical component prior to the first sub-element or the second sub-element.

5. The method of claim 1, further comprising:
in response to determining that the temporal dependency of the second sub-element on the first sub-element has changed, providing a rescheduling suggestion that increases an overall efficiency of performance of the first sub-element, the second sub-element and downstream sub-elements.

6. The method of claim 1, further comprising:
in response to determining that the temporal dependency of the second sub-element on the first sub-element has changed, providing an automatic modification to resolve a conflict caused by the changed temporal dependency.

7. The method of claim 6, further comprising propagating the automatic modification to resolve conflicts caused to subsequent sub-elements.

8. The method of claim 1, further comprising:
determining whether a third sub-element requires integrating respective components from the first sub-element and the second sub-element; and
in response to determining that the third sub-element requires integrating the respective components, updating the work order to indicate that the first sub-element and the second sub-element are completed prior to a beginning of the third sub-element.

9. An apparatus comprising one or more computers and one or more storage devices storing instructions that are operable, when executed by the one or more computers, to cause the one or more computers to perform operations comprising:
storing data representing respective sub-elements of a complex task;
storing data representing one or more links between two or more sub-elements, the links indicating a dependency between said sub-elements, wherein the links indicate a temporal dependency of a second sub-element on a first sub-element;
identifying a change in a performance, or in a physical component, of any of the first sub-element or the second sub-element;
determining, from the identified change, whether the temporal dependency of the second sub-element on the first sub-element has changed, comprising:
receiving an input;
generating, using a neural network, a semantic output from the input;
determining, from the semantic output:
a state of any of the first sub-element and the second sub-element; and
a modification to be applied to a link between the first sub-element and the second sub-element;
in response to determining that the temporal dependency has changed, updating a work order based on the modification; and
providing a graphical representation of the updated work order, the graphical representation comprising:
an ordered list of priorities of the respective sub-elements based on deadlines of the respective sub-elements; or statuses of the respective sub-elements, the statuses indicating whether the respective sub-elements are overdue or unscheduled.

10. The apparatus of claim 9, wherein the determining whether the temporal dependency of the second sub-element on the first sub-element has changed comprises:
determining, from the identified change, whether the second sub-element is temporally dependent on the first sub-element;
in response to determining that the second sub-element is not temporally dependent on the first sub-element, updating the work order to indicate that the first sub-element and the second sub-element are performed at least partially in parallel.

11. The apparatus of claim 9, wherein the determining whether the temporal dependency of the second sub-element on the first sub-element has changed comprises:
determining, from the identified change, whether the second sub-element determined to be previously temporally independent from the first sub-element has become temporally dependent on the first sub-element; and in response to determining that the second sub-element is now temporally dependent on the first sub-element, updating the work order to indicate that the first sub-element and the second sub-element are performed at least partially in series.

12. The apparatus of claim 9, wherein the instructions further cause the one or more computers to perform:

determining whether a physical component to be used in the first sub-element or the second sub-element is available during at least a threshold portion of a duration or a predicted duration of the first sub-element or the second sub-element; and in response to determining that the physical component is unavailable for more than the threshold portion, adding a new sub-element to determine an availability of the physical component prior to the first sub-element or the second sub-element.

13. The apparatus of claim 9, wherein the instructions further cause the one or more computers to perform:

in response to determining that the temporal dependency of the second sub-element on the first sub-element has changed, providing a rescheduling suggestion that increases an overall efficiency of performance of the first sub-element, the second sub-element and downstream sub-elements.

14. A non-transitory computer storage medium encoded with instructions that, when executed by one or more computers, cause the one or more computers to perform operations comprising:

storing data representing respective sub-elements of a complex task;

storing data representing one or more links between two or more sub-elements, the links indicating a dependency between said sub-elements, wherein the links indicate a temporal dependency of a second sub-element on a first sub-element;

identifying a change in a performance, or in a physical component, of any of the first sub-element or the second sub-element;

determining, from the identified change, whether the temporal dependency of the second sub-element on the first sub-element has changed, comprising:

receiving an input;

generating, using a neural network, a semantic output from the input;

determining, from the semantic output:

a state of any of the first sub-element and the second sub-element; and a modification to be applied to a link between the first sub-element and the second sub-element;

in response to determining that the temporal dependency has changed, updating a work order based on the modification; and providing a graphical representation of the updated work order, the graphical representation comprising:

an ordered list of priorities of the respective sub-elements based on deadlines of the respective sub-elements; or statuses of the respective sub-elements, the statuses indicating whether the respective sub-elements are overdue or unscheduled.

15. The non-transitory computer storage medium of claim 14, wherein the instructions further cause the one or more computers to perform:

determining whether a physical component to be used in the first sub-element or the second sub-element is available during at least a threshold portion of a duration or a predicted duration of the first sub-element or the second sub-element; and in response to determining that the physical component is unavailable for more than the threshold portion, adding a new sub-element to determine an availability of the physical component prior to the first sub-element or the second sub-element.

* * * * *